United States Patent
Grinstead et al.

(10) Patent No.: US 9,211,648 B2
(45) Date of Patent: Dec. 15, 2015

(54) OPERATING A MOBILE ROBOT

(71) Applicant: iRobot Corporation, Bedford, MA (US)

(72) Inventors: Marshall Grinstead, Bedford, MA (US); Orin P.F. Hoffman, Boston, MA (US)

(73) Assignee: iRobot Corporation, Bedford, MA (US)

( * ) Notice: Subject to any disclaimer, the term of this patent is extended or adjusted under 35 U.S.C. 154(b) by 304 days.

(21) Appl. No.: 13/856,048

(22) Filed: Apr. 3, 2013

(65) Prior Publication Data

US 2013/0268118 A1 Oct. 10, 2013

Related U.S. Application Data

(60) Provisional application No. 61/620,832, filed on Apr. 5, 2012.

(51) Int. Cl.
| | |
|---|---|
| *G05B 15/00* | (2006.01) |
| *G05B 19/00* | (2006.01) |
| *B25J 19/02* | (2006.01) |
| *B25J 15/00* | (2006.01) |
| *B25J 5/00* | (2006.01) |
| *B25J 13/00* | (2006.01) |
| *H04B 7/155* | (2006.01) |
| *G05D 1/00* | (2006.01) |

(52) U.S. Cl.
CPC ............ *B25J 19/023* (2013.01); *B25J 5/005* (2013.01); *B25J 13/006* (2013.01); *B25J 15/0028* (2013.01); *G05D 1/0022* (2013.01); *H04B 7/15514* (2013.01); *G05D 2201/0207* (2013.01); *G05D 2201/0209* (2013.01)

(58) Field of Classification Search
CPC .... B25J 13/006; B25J 15/0028; B25J 19/023; B25J 5/005; H04B 7/15514; G05D 2201/0209; G05D 2201/0207

USPC .................................................. 700/245–264
See application file for complete search history.

(56) References Cited

U.S. PATENT DOCUMENTS

| | | | |
|---|---|---|---|
| 6,263,989 B1 * | 7/2001 | Won .............................. | 180/9.32 |
| 7,011,171 B1 * | 3/2006 | Poulter ......................... | 180/8.2 |
| 7,546,891 B2 * | 6/2009 | Won .............................. | 180/9.32 |
| 7,860,614 B1 * | 12/2010 | Reger ............................ | 700/264 |
| 7,926,598 B2 * | 4/2011 | Rudakevych ................. | 180/9.32 |
| 2003/0167139 A1 * | 9/2003 | Swartz et al. .................. | 702/65 |
| 2005/0004708 A1 * | 1/2005 | Goldenberg et al. .......... | 700/245 |
| 2006/0213167 A1 * | 9/2006 | Koselka et al. ............. | 56/10.2 A |
| 2010/0068024 A1 * | 3/2010 | Agens ........................... | 414/729 |
| 2010/0179691 A1 * | 7/2010 | Gal et al. ....................... | 700/259 |
| 2011/0040427 A1 * | 2/2011 | Ben-Tzvi ......................... | 701/2 |
| 2011/0054691 A1 * | 3/2011 | Lee et al. ...................... | 700/259 |
| 2012/0095619 A1 * | 4/2012 | Pack et al. ......................... | 701/2 |

OTHER PUBLICATIONS

Junyao, coal mine detect and rescue robot technique research, Jun. 22, 2009, IEEE.*

* cited by examiner

*Primary Examiner* — Jason Holloway
*Assistant Examiner* — Rachid Bendidi
(74) *Attorney, Agent, or Firm* — Honigman Miller Schwartz and Cohn LLP

(57) ABSTRACT

A robot system that includes an operator control unit, mission robot, and a repeater. The operator control unit has a display. The robot includes a robot body, a drive system supporting the robot body and configured to maneuver the robot over a work surface, and a controller in communication with the drive system and the operator control unit. The repeater receives a communication signal between the operator control unit and the robot and retransmits the signal.

21 Claims, 15 Drawing Sheets

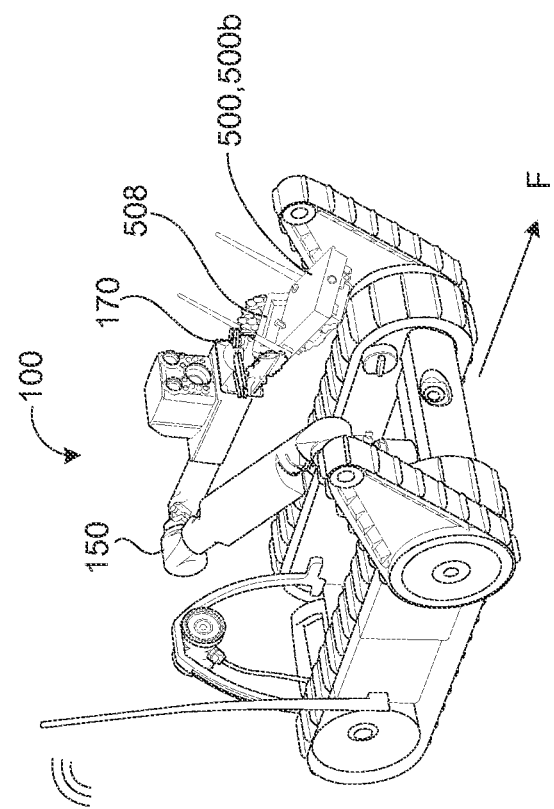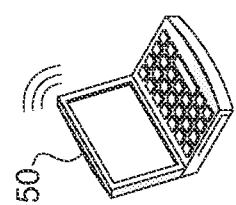
FIG. 8D

OPERATING A MOBILE ROBOT

CROSS REFERENCE TO RELATED APPLICATIONS

This U.S. patent application claims priority under 35 U.S.C. §119(e) to U.S. Provisional Application 61/620,832, filed on Apr. 5, 2012, which is hereby incorporated by reference in its entirety.

TECHNICAL FIELD

This disclosure relates to mobile robot systems having extended communication networks.

BACKGROUND

Robots are useful in a variety of civilian, military, and law enforcement applications. For instance, some robots may inspect or search buildings with structural damage caused by earthquakes, floods, or hurricanes, or inspect buildings or outdoor sites contaminated with radiation, biological agents such as viruses or bacteria, or chemical spills. Some robots carry appropriate sensor systems for inspection or search tasks. Robots designed for military applications may perform operations that are deemed too dangerous for soldiers. For instance, the robot can be used to leverage the effectiveness of a human "point man." Law enforcement applications include reconnaissance, surveillance, bomb disposal and security patrols.

Small, portable, unmanned mobile ground robots can gather situational awareness in dangerous conditions for warfighters and public safety professionals. These robots may be remotely operated; however, when an untethered robot (wireless operated) is driven into buildings, around obstacles, and/or into tunnels a communication control signal can become attenuated, sometimes compromising remote operation.

SUMMARY

One aspect of the disclosure provides a robot system that includes an operator control unit, mission robot, and a repeater. The operator control unit has a display. The mission robot includes a robot body, a drive system supporting the robot body and configured to maneuver the robot over a work surface, and a controller in communication with the drive system and the operator control unit. The repeater receives a communication signal between the operator control unit and the mission robot and retransmits the signal. The repeater can therefore extend a communication network between the operator control unit and the mission robot, allowing longer range missions and missions into signal attenuating situations (e.g., into tunnels and buildings and around signal attenuating structures).

Implementations of the disclosure may include one or more of the following features. In some implementations, the repeater is a mobile robot that includes a robot body, a drive system supporting the robot body and configured to maneuver the robot over a work surface, and a controller in communication with the drive system. The controller of the repeater robot has a communication system that receives a communication signal between the operator control unit and the mission robot and retransmits the signal. The controller of the repeater robot may communicate with the operator control unit (e.g., to receive drive commands). In some examples, the repeater robot includes an imaging sensor in communication with its controller. The imaging sensor may be arranged to capture at least one of images and video about the repeater robot. Moreover, the operator control unit can display the captured at least one of images and video by the imaging sensor of the repeater robot.

In some implementations, the repeater robot includes a sensory system for obtaining a local sensory perception about the repeater robot. The controller of the repeater robot may execute a control system that includes a control arbitration system and a behavior system in communication with each other. The behavior system executes at least one behavior that influences execution of commands by the control arbitration system based on sensor signals received from the sensor system.

The repeater robot may include at least one flipper rotatably coupled to the robot body and capable of rotating a continuous 360 degrees. The behavior system executes a self-righting behavior in response to receiving an indication of a non-upright orientation that causes execution of commands to rotate the at least one flipper a continuous 360 degrees, causing the main body to flip 180 degrees. A center of gravity of the repeater robot is located within a rotation envelope of the at least one flipper.

The behavior system may execute a find deployer behavior that causes execution of commands to ascertain imagery of a surrounding environment using an imaging sensor in communication with the controller of the repeater robot. The find deployer behavior also causes execution of commands to identify a deployer of the repeater robot (e.g., an operator or the mission robot) and orient the repeater robot to capture the deployer in a field of view of the imaging sensor of the repeater robot.

In some implementations, the repeater is a stationary communication device configured to passively self-right when oriented in a non-upright position. In some examples, the repeater includes a battery base, an electronics enclosure supported by the battery base, and at least one antenna supported by at least one of the battery base and the electronics enclosure. A product of a center of mass and a height of the electronics enclosure is less than a product of a center of mass and a height of the battery base. In some examples, a center of mass of the repeater is located below at least one of a bottom surface and a bottom corner of the electronics enclosure when oriented in an upright orientation.

The mission robot may be capable of carrying and deploying the repeater away from the remote operator. Moreover, the repeater may retransmit the received signal at a power level greater than or equal to a power level of the received signal.

The operator control unit may display multiple views providing at least one of imagery and video captured by imaging sensors of the mission robot and the repeater. For example, the operator control unit can display a first-person view from the mission robot and one or more third-person views from repeater(s). In some examples, where the robot system includes both repeater robot(s) and stationary repeater(s), the operator control unit may display first-person views from both the repeater robot(s) and the stationary repeater(s).

Another aspect of the disclosure provides a self-righting repeater for a mobile robot communications network. The repeater includes a battery base, an electronics enclosure supported by the battery base, and at least one antenna supported by at least one of the battery base and the electronics enclosure. A product of a center of mass and a height of the electronics enclosure is less than a product of a center of mass and a height of the battery base. In some examples, a center of mass of the repeater is located below at least one of a bottom surface and a bottom corner of the electronics enclosure when oriented in an upright orientation. The repeater may retransmit the received signal at a power level greater than or equal to a power level of the received signal.

Yet another aspect of the disclosure provides a method of operating a mobile mission robot. The method includes driving the mission robot according to a drive command issued by a remote operator control unit in communication with the mission robot and deploying a repeater. The repeater receives a communication signal between the operator control unit and the mission robot and retransmits the signal.

In some implementations, the method includes carrying the repeater on the mission robot before deployment. The method may include deploying the repeater near a threshold communication range between the mission robot and the operator control unit. Consequently, the repeater can extend a communication network between the mission robot and the operator control unit. Moreover, the repeater may retransmit the received signal at a power level greater than or equal to a power level of the received signal.

Another aspect of the disclosure provides a method of operating a mobile mission robot. The method includes driving the robot according to a drive command issued by a remote operator control unit in communication with the robot. The robot has a gripper thereon for retaining and transporting a repeater in communication with the operator control unit and the robot. The method includes deploying the repeater by releasing the repeater from the gripper at a first distance from the operator control unit and driving the robot to a second distance from the operator control unit. The second distance is greater than the first distance. The repeater is configured to receive a communication signal from the operator control unit and retransmit that communication signal to the robot or receive a communication signal from the robot and retransmit that communication signal to the operator control unit.

The method may include displaying on the operator control unit multiple views of at least one of images and video captured by imaging sensors on the mission robot and the repeater. This allows the operator of the operator control unit to view a first-person view from the mission robot and a third person view from the repeater (e.g., of the mission robot and/or along a drive path of the mission robot). The repeater at the first distance may receive images or videos captured by imaging sensors on the robot and transmit images or videos captured by both imaging sensors on the robot and the repeater to the operator control unit.

In some implementations, the repeater is a mobile robot and the method includes driving the repeater robot according to a drive command issued by the remote operator control unit. The repeater robot may include a robot body, a drive system supporting the robot body and configured to maneuver the robot over a work surface, and a controller in communication with the drive system and the operator control unit. The controller has a communication system that receives a communication signal between the operator control unit and the mission robot and retransmits the signal.

In some implementations, the method includes executing a control system on the repeater robot controller. The control system includes a control arbitration system and a behavior system in communication with each other. The behavior system executes at least one behavior that influences execution of commands by the control arbitration system based on sensor signals received from a sensor system in communication with the controller of the repeater robot. In some examples, the method includes executing a self-righting behavior on the behavior system. The self-righting behavior causes execution of commands in response to receiving an indication of a non-upright orientation to rotate at least one flipper rotatably coupled to the robot body a continuous 360 degrees, causing the main body to flip 180 degrees. A center of gravity of the repeater robot is located within a rotation envelope of the at least one flipper. Additionally or alternatively, the method may include executing a find deployer behavior on the behavior system. The find deployer behavior causes execution of commands to ascertain imagery of a surrounding environment using an imaging sensor in communication with the controller of the repeater robot, identify a deployer of the repeater robot, and orient the repeater robot to capture the deployer in a field of view of the imaging sensor of the repeater robot.

The repeater may retransmit the received signal at a power level greater than or equal to a power level of the received signal. Moreover, the repeater may include a battery base, an electronics enclosure supported by the battery base, and at least one antenna supported by at least one of the battery base and the electronics enclosure. A product of a center of mass and a height of the electronics enclosure is less than a product of a center of mass and a height of the battery base.

Another aspect of the disclosure provides a method of operating a mobile mission robot that includes driving the robot into a tunnel according to a drive command issued by a remote operator control unit in communication with the robot and deploying a repeater at an entrance of the tunnel along an axis defined by the tunnel. The repeater has a direct line of sight into the tunnel along or in parallel to the tunnel axis. The repeater is configured to: receive a communication signal from the operator control unit and retransmit that communication signal to the robot positioned in the tunnel; or receive a communication signal from the robot and retransmit that communication signal to the operator control unit.

In some implementations, the operator control unit is unable to directly transmit a communication signal to the robot positioned in the tunnel. The robot may include a gripper configured to grasp, transport, and release the repeater. The repeater may be a mobile robot, and, is such case; the method may include driving the repeater robot to the tunnel entrance according to a drive command issued by the remote operator control unit. The method may include driving the repeater robot around the tunnel entrance or into the tunnel along the tunnel axis to improve communication connectivity with the robot in the tunnel. In some examples, the method includes deploying two or more repeaters sequentially along the tunnel axis at different distances from the operator control unit. The repeater having the greatest distant from the operator control unit is closest to and in communication with the robot. The method may include displaying on the operator control unit multiple views of at least one of images and video captured by imaging sensors on the robot and the repeater.

Another aspect of the disclosure provides a remote controller that includes a computing processor, a display in communication with the computing processor, and a network interface in communication with the computing processor. The network interface receives and displays on the display images or video from first and second robots simultaneously. The first robot is an access point for the second robot by transporting and routing signals from both robots to the network interface. In some implementations, the first robot receives images or videos captured by imaging sensors on the first and second robots and transmits the images or video to the network interface.

The remote controller may include non-transitory memory that stores executable code stored and in communication with the computing processor. The executable code identifies the images or video originating from the first robot and the images or video originating from the second robot and instructing the remote controller to present the images or video accordingly on the display. Either the first robot or the second robot can act as the access point for the other robot. In some examples, the first robot is at or within a threshold communication distance for communicating with the network interface and the second robot is positioned beyond the threshold communication distance.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 8D-8F are perspective view of an exemplary mobile robot carrying a repeater, dropping the repeater a distance from an operator control unit, and proceeding to journey forward beyond the repeater.

Like reference symbols in the various drawings indicate like elements.

DETAILED DESCRIPTION

Figure 1A:
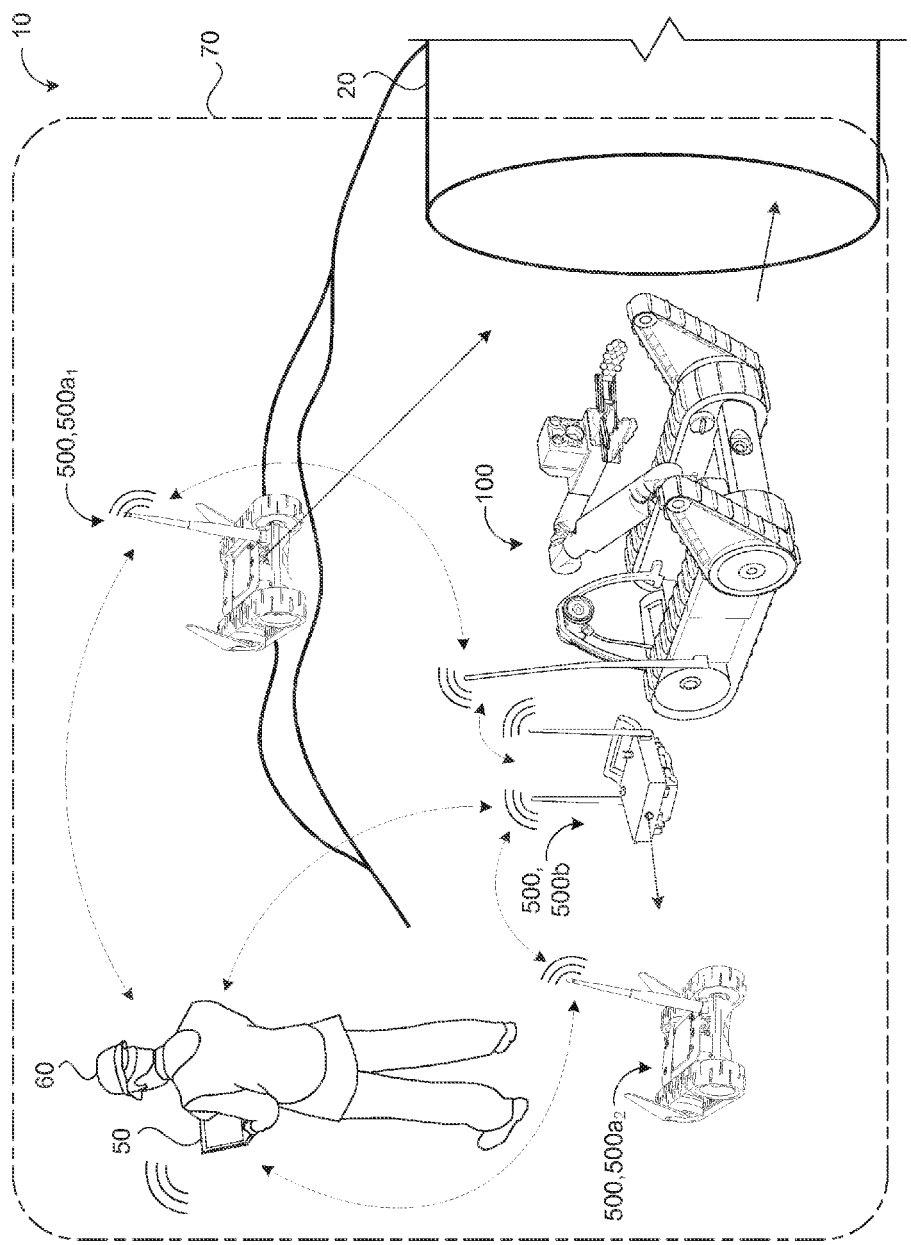
FIGS. 1A and 1B are schematic views of exemplary robot systems.
Figure 1B:
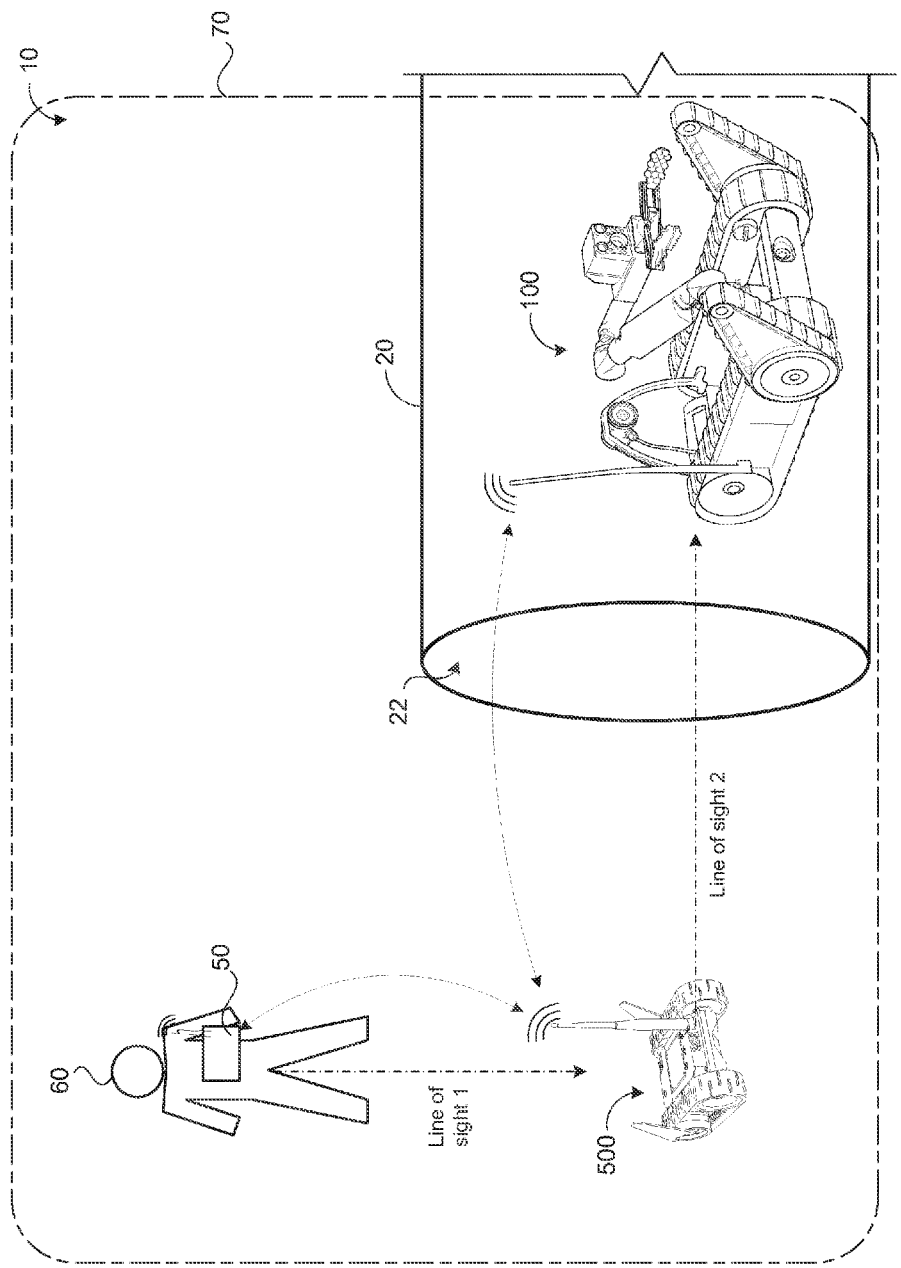

One challenge that many radio-controlled vehicles (RCV) face is communication through or around obstacles. For example, if a remote operator wants to drive the vehicle into a culvert, the radio signal may be severely attenuated. Referring to FIG. 1A, in some implementations, a robot system 10 includes an operator control unit (OCU) 50 in communication with a mobile robot 100. The operator control unit 50 allows a remote operator 60 to partially or fully operate the robot 100 within a threshold communication range. In some implementations, one or more repeaters 500 extend the communication range between the operator control unit 50 and the robot 100. In some examples, as shown in FIG. 1B, a repeater 500 can be positioned adjacent the opening 22 of a culvert 20, allowing continued communication between the operator control unit 50 and the robot 100 while its driving in the culvert 20. The repeater 500 can therefore extend a communication network between the operator control unit 50 and the robot 100, allowing relatively longer range missions and missions into signal attenuating situations (e.g., into tunnels 20 and buildings and around signal attenuating structures). As indicated in FIG. 1B, a first line of sight 1 from the OCU 50 to the repeater 500 may not be parallel to or collinear with a line of sight 2 from the OCU 50 to the mobile robot 100. In some implementations, no line of sight exists between the OCU 50 and the mobile robot 100. The mobile robot 100 may be in communication with the OCU 50 via the repeater 500 positioned therebetween and having a direct first line of sight 1 to the OCU 50 and a direct second line of sight 2 to the mobile robot 100.

FIGS. 2-5 illustrate an exemplary mobile robotic vehicle, or robot, 100 that may be used as a Small Unmanned Ground Vehicle (SUGV) capable of conducting operations in urban terrain, tunnels, sewers, caves, etc. Moreover, the robot 100 may aid in the performance of urban Intelligence, Surveillance, and Reconnaissance (ISR) missions, chemical/Toxic Industrial Chemicals (TIC), Toxic Industrial Materials (TIM), reconnaissance. Although the robot 100 shown includes a track driven drive system having flippers, other mobility platforms, configurations and morphologies are possible as well, such as wheel driven platforms, crawling or walking platforms, etc. The robot 100 can be designed to move about in a variety of environments, including an urban environment of buildings (including staircases), streets, underground tunnels, building ruble, and in vegetation, such as through grass and around trees. The robot 100 may have a variety of features which provide robust operation in these environments, including impact resistance, tolerance of debris entrainment, and invertible operability.

Examples of various tracked robotic vehicles or robots are shown and described in U.S. Pat. Nos. 6,431,296, 6,263,989, 6,668,951 and 6,651,885. The disclosures of these patents are considered part of the disclosure of this application and are hereby incorporated by reference in their entireties. The aforementioned patents describe the construction of various tracked robotic vehicles having driven flippers and articulated robotic components.

Figure 2:
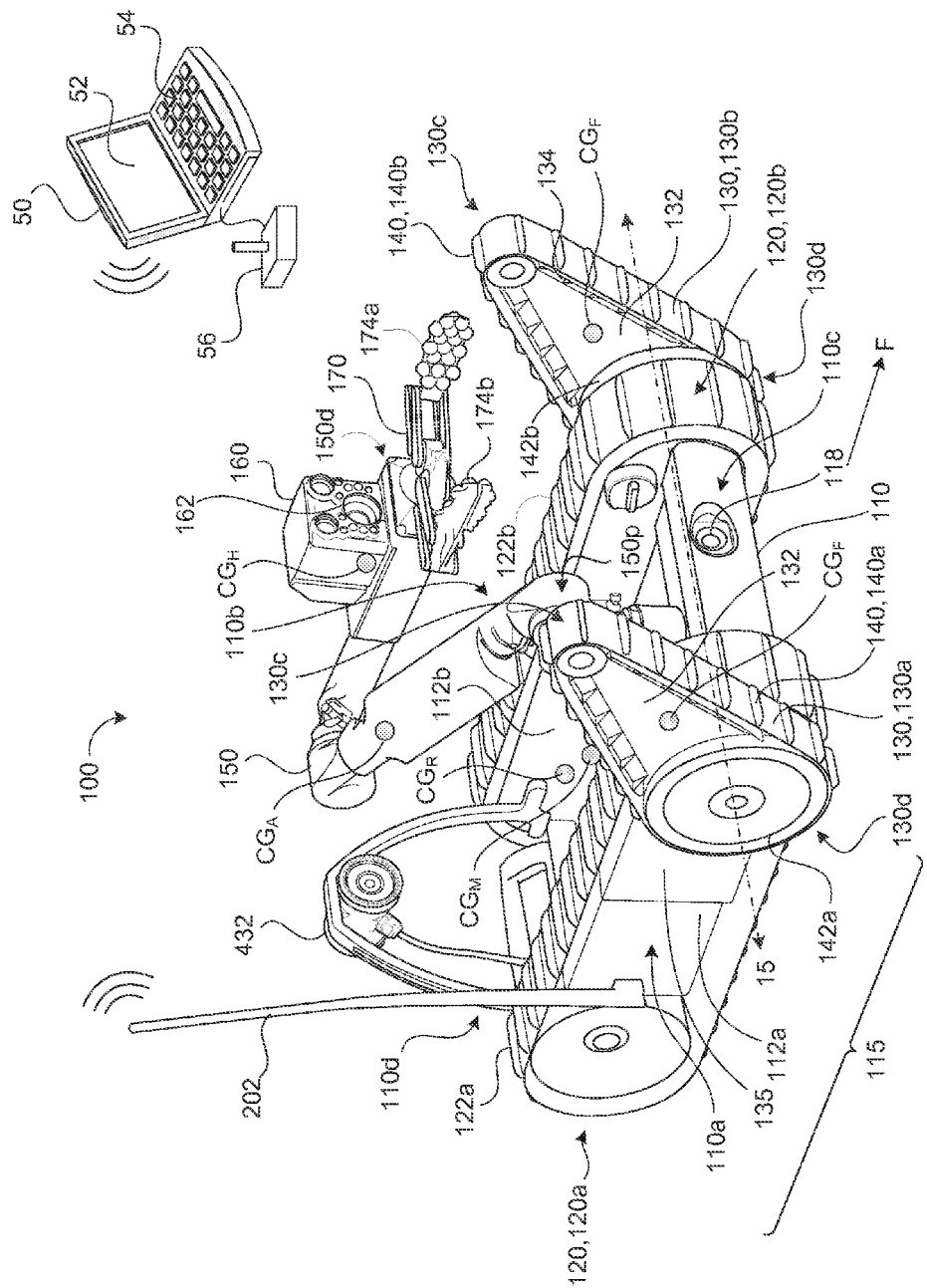
FIG. 2 is a perspective view of an exemplary mobile robot remotely operated by an operator control unit.
Figure 3:
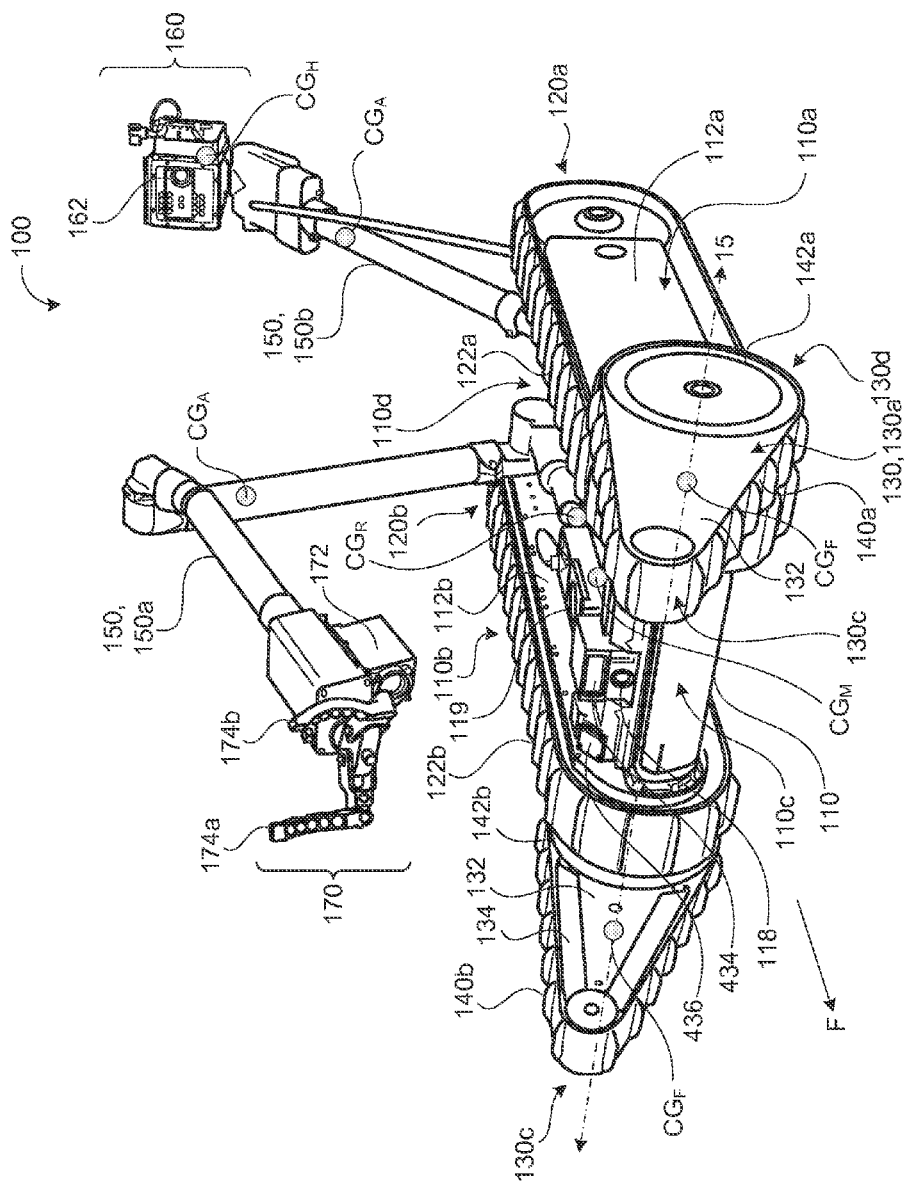
FIG. 3 is a perspective view of an exemplary mobile robot having forward flippers and two manipulator arms.
Figure 4:
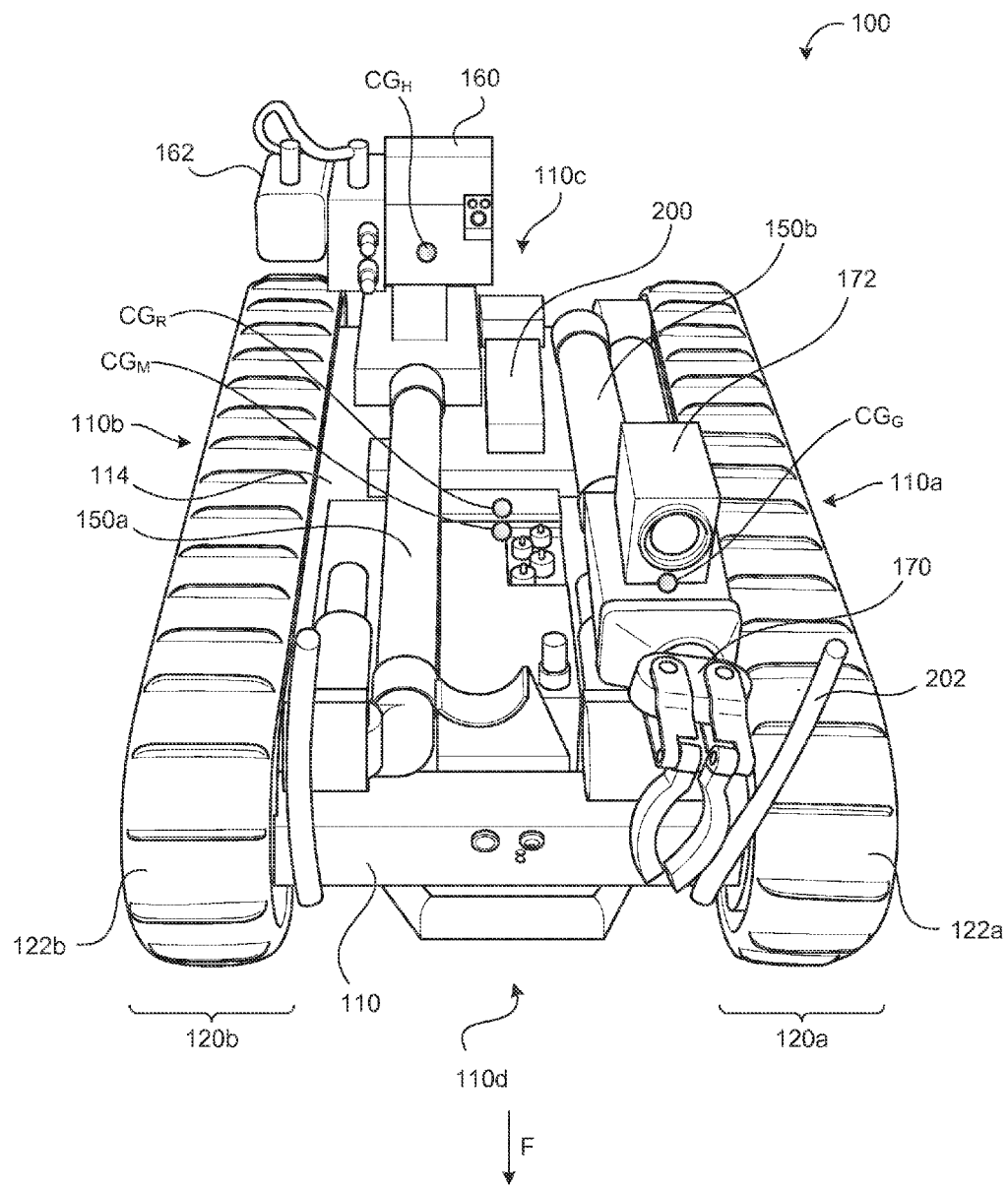
FIG. 4 is a rear perspective view of an exemplary robot without flippers.
Figure 5:
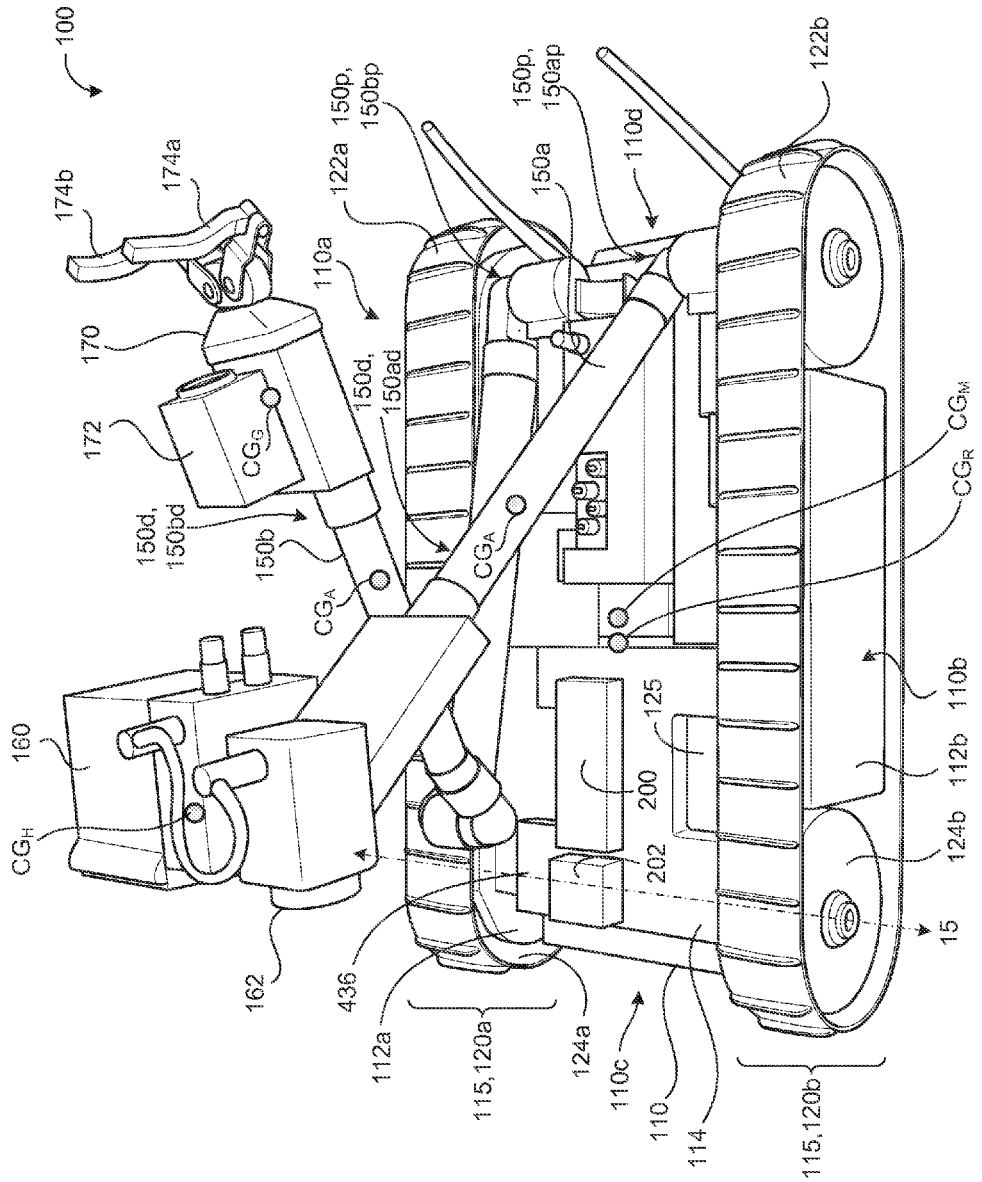
FIG. 5 is a side perspective view of the robot shown in FIG. 4.

Referring to FIGS. 2 and 3, the robot 100 includes a main body 110 (or chassis) having a drive system 115 supported by the main body 110. The main body 110 has right and left sides 110a, 110b as well as a leading end 110c, a trailing end 110d and a center of gravity $CG_M$. In the example shown, the main body 110 includes right and left rigid side plates 112a, 112b disposed parallel to each other. At least one transverse support 114 rigidly couples the right side place 112a to the left side plate 112b. The rigid components are designed for strength and low weight and can be made from a material such as 7075-T6 aluminum. Alternative versions of the robot 100 can use other materials, such as other lightweight metals, polymers, or composite materials. The robot 100 may be electrically powered (e.g. by a bank of standard military BB-2590 replaceable and rechargeable lithium-ion batteries).

In some implementations, the drive system 115 includes right and left driven track assemblies 120a, 120b (also referred to as the main tracks 120) mounted on the corresponding right and left sides 110a, 110b of the main body 110 and having right and left driven tracks 122a, 122b respectively. Each driven track 122a, 122b is trained about a corresponding front wheel, 124a, 124b (FIG. 5), which rotates about a drive axis 15. Although the robot 100 is depicted as having skid steer driven tracks, other drive systems are possible as well, such as differentially driven wheels, articulated legs, etc.

In the examples shown in FIGS. 2 and 3, the robot 100 includes at least one extendable flipper 130 mounted on the main body 110. In the examples shown in FIGS. 4 and 5, the robot 100 is depicted without any flippers 130, but may be configured to releasable receive one or more flippers 130 onto the main body 110 (e.g., onto and concentric with one of the front drive wheels 124a, 124b at the leading end 110c of the main body 110). Referring again to FIGS. 2 and 3, the robot 100 includes right and left flippers 130a, 130b, which are shown in an extended configuration extending beyond the front or leading end 110c of the main body 110. The flippers 130, 130a, 130b each have a distal end 130c, a pivot end 130d, and a flipper center of gravity $CG_F$ between the distal and pivot ends 130c, 130d. Each flipper 130, 130a, 130b pivots about the drive axis 15 near the leading end 110c of the main body 110. Moreover, each flipper 130, 130a, 130b may have a driven flipper track 140, 140a, 140b trained about flipper drive wheel 142a, 142b, which is driven about the drive axis 15 at the pivot end 130d of the flipper 130a, 130b. In the example shown, flipper track supports 134 disposed on a flipper side plate 132 of the flipper 130 support the corresponding flipper track 140. In some implementations, the flippers 130, 130a, 130b can be rotated in unison in a continuous 360 degrees between a stowed position, in which the flippers 130a, 130b are next to the right and left side plates 112a, 112b of the main body 110, and at least one deployed position, in which the flippers 130a, 130b are pivoted at an angle with respect to the main tracks 122a, 122b. The center of gravity $CG_R$ of the robot 100 can be contained within an envelope of the 360 degree rotation of the flippers 130a, 130b.

In some implementations, the flipper side plates 132 of the respective right and left flippers 130a, 130b are rigidly coupled to one another through the articulator shaft to move together in unison. In other implementations, the flippers 130a, 130b pivot independently of each other. The combination of main tracks assemblies 120a, 120b and flippers 130, 130a, 130b provide an extendable drive base length to negotiate gaps in a supporting surface. In some examples, the right main tack 122a and the right flipper track 140a are driven in unison and the left main tack 122b and the left flipper track 140b are driven in unison to provide a skid steer drive system.

The main body 110 may include one or more cameras 118, 119 disposed near the leading end 110c of the main body 110 and may be positioned to have a field of view directed forward and/or upward. The camera(s) 118, 119 may capture images and/or video of the robot environment for navigating the robot 100 and/or performing specialized tasks, such as maneuvering through tunnels, sewers, and caves, etc.

Referring to FIGS. 2-5, the robot 100 may include one or more arms 150, 150a, 150b (e.g., articulated arms) each having a pivot end 150p, 150ap, 150bp pivotally coupled to the main body 110 and a distal end 150d, 150ad, 150bd that may be configured to receive a head 160 or a gripper 170. In some implementations, the robot 100 includes first and second arms 150a, 150b each having a pivot end 150ap, 150bp pivotally coupled to the main body 110. Both arms 150a, 150b may be attached at a common location or region of the main body 110, such as the leading end 110c or the trailing end 110d (as shown) of the main body 110, the arms 150a, 150b can be disposed at opposite ends of the main body 110 as well. For example, the pivot end 150ap of the first arm 150a can be attached near the trailing end 110d of the main body 110 and the pivot end 150bp of the second arm 150b can be attached near the leading end 110c of the main body 110. The arms 150a, 150b may be coupled to the main body 110 in a manner that allows the arms 150a, 150b to be stowed along the main body 110 in a compact configuration and pivot in opposite directions away from main body 110 to allow a wider range of CG-shifting, for example, to negotiate obstacles.

In the example shown in FIG. 2, a head 160 and a gripper 170 is mounted on the distal end 150d of the arm 150. In the example shown in FIGS. 3-5, the head 160 is mounted on the distal end 150ad of the first arm 150a and the gripper 170 is mounted on the distal end 150bd of the second arm 150b. The gripper 170 may include a gripper camera 172 and first and second opposing fingers or tongs 174a, 174b for grasping objects.

Each arm 150, 150a, 150b has an arm center of gravity $CG_A$ and the head 160 has a center of gravity $CG_H$. The head 160 may include a camera 162 (e.g., visible light and/or infrared camera), radar, LIDAR (Light Detection And Ranging, which can entail optical remote sensing that measures properties of scattered light to find range and/or other information of a distant target), LADAR (Laser Detection and Ranging), a communication device (radio frequency, wireless, etc.), and/or other components.

Referring again to FIGS. 2 and 4, in some implementations, the robot 100 includes a controller 200 in communication with the drive system 115, any arm(s) 150, 150a, 150b and head(s) 160 or gripper(s) 170 mounted on the arm(s) 150, 150a, 150b, and a sensor system 400. The controller 200 may issue drive commands to one or more motors 125 driving the main tracks 120 and the flipper tracks 140. Moreover, the controller 200 may issue rotational commands to a flipper motor 135 to rotate the flippers 130 about the drive axis 15. The controller 200 may include one or more computer processors and associated memory systems.

To achieve reliable and robust autonomous or semi-autonomous movement, the robot 100 may include a sensor system 400 having several different types of sensors. The sensors can be used in conjunction with one another to create a perception of the robot's environment (i.e., a local sensory perception) sufficient to allow the robot 100 to make intelligent decisions about actions to take in that environment. The sensor system 400 may include one or more types of sensors supported by the robot body 110, which may include obstacle detection obstacle avoidance (ODOA) sensors, communication sensors, navigation sensors, etc. For example, these sensors may include, but not limited to, proximity sensors 432, contact sensors, camera(s) 118, 119, 162, 172 (e.g., volumetric point cloud imaging, three-dimensional (3D) imaging or depth map sensors, visible light camera and/or infrared camera), sonar (e.g., ranging sonar and/or imaging sonar), radar, LIDAR (Light Detection And Ranging, which can entail optical remote sensing that measures properties of scattered light to find range and/or other information of a distant target), LADAR (Laser Detection and Ranging), laser scanner, ultrasound sensor, etc. Sensor data obtained from the sensor system 400 may be communicated to the OCU 50 for use by the user. For example, the OCU 50 may process and display the sensor data in one or more graphical representations.

The proximity sensors 432 may be converging infrared (IR) emitter-sensor elements, sonar sensors, ultrasonic sensors, and/or imaging sensors (e.g., 3D depth map image sensors) that provide a signal to the controller 200 when an object is within a given range of the robot 100. The controller 200 (executing a control system) may execute behaviors that cause the robot 100 to take an action, such as changing its direction of travel, when an obstacle is detected.

The sensor system 400 may include a laser scanner 434 mounted on a forward portion of the robot body 110 and in communication with the controller 200. In the examples shown, the laser scanner 434 is mounted on the main body 110 facing forward (e.g., having a field of view along the forward drive direction F). The laser scanner 434 scans an area about the robot 100 and the controller 200, using signals received from the laser scanner 434, may create an environment map or object map of the scanned area. The controller 200 may use the object map for navigation, obstacle detection, and obstacle avoidance. Moreover, the controller 200 may use sensory inputs from other sensors of the sensor system 400 for creating object map and/or for navigation.

In some examples, the laser scanner 434 is a scanning LIDAR, which may use a laser that quickly scans an area in one dimension, as a "main" scan line, and a time-of-flight imaging element that uses a phase difference or similar technique to assign a depth to each pixel generated in the line (returning a two dimensional depth line in the plane of scanning). In order to generate a three dimensional map, the LIDAR can perform an "auxiliary" scan in a second direction (for example, by "nodding" the scanner). This mechanical scanning technique can be complemented, if not supplemented, by technologies such as the "Flash" LIDAR/LADAR and "Swiss Ranger" type focal plane imaging element sensors, techniques which use semiconductor stacks to permit time of flight calculations for a full 2-D matrix of pixels to provide a depth at each pixel, or even a series of depths at each pixel (with an encoded illuminator or illuminating laser).

The sensor system 400 may include one or more three-dimensional (3-D) image sensors in communication with the controller 200. In the example shown, any of the cameras 118, 119, 162, 172 can be more three-dimensional (3-D) image sensors. If the 3-D image sensor has a limited field of view, the controller 200 or the sensor system 400 can actuate the 3-D image sensor in a side-to-side scanning manner to create a relatively wider field of view to perform robust ODOA.

In some examples, the sensor system 400 includes an inertial measurement unit (IMU) 436 in communication with the controller 200 to measure and monitor a moment of inertia of the robot 100 with respect to the overall center of gravity $CG_R$ of the robot 100. The controller 200 may monitor any deviation in feedback from the IMU 436 from a threshold signal corresponding to normal unencumbered operation. For example, if the robot begins to pitch away from an upright position, it may be "clothes lined" or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

When accelerating from a stop, the controller 200 may take into account a moment of inertia of the robot 100 from its overall center of gravity $CG_R$ to prevent robot tipping. The controller 200 may use a model of its pose, including its current moment of inertia. When payloads are supported, the controller 200 may measure a load impact on the overall center of gravity $CG_R$ and monitor movement of the robot moment of inertia. If this is not possible, the controller 200 may apply a test torque command to the drive system 115 and measure actual linear and angular acceleration of the robot using the IMU 436, in order to experimentally determine safe limits.

The controller 200 of the robot 100 may include a communication system 202, which includes, for example, a radio to communicate with the remote operator control unit (OCU) 50 to receive commands and issue status and/or navigation information. The OCU 50 may include a display 52 (e.g., LCD or touch screen), a keyboard 54, and one or more auxiliary user inputs 56, such a joystick or gaming unit. The OCU 50 may also include a computing processor 55 and memory 57 (FIG. 8) in communication therewith. The processor 55 capable of rendering graphics on the display 52. The OCU 50 allows an operator or user to control the robot 100 from a distance. In some examples, the user can select different levels of human control over the robot 100, ranging from a teleoperation mode, in which the user directly controls the motors and actuators on the robot 100, to autonomous operation, in which the user passes higher-level commands to the robot 100. In partially autonomous operation, the robot 100 can perform tasks such as following a perimeter or wall, recovering from getting stuck in an opening or due to high centering on an obstruction, evading a moving object, or seeking light.

Referring to FIGS. 1A, 1B, 6 and 7, when the robot 100 maneuvers into a tunnel 20 (e.g., a culvert, a cave, etc.), behind an obstacle, or into a building, the communication signal between the operator control unit 50 and the robot 100 may become attenuated, disrupting the communication therebetween. One or more repeaters 500 can be deployed to increase an effective communication range between the operator control unit 50 and the robot 100. The repeater 500 can be an electronic device that receives a signal and retransmits it at a higher level or higher power, or onto the other side of an obstruction, so that the signal can cover longer distances. The repeater 500 may receive and transmit analog and/or digital signals. Each repeater 500 acts as a transceiver by receiving signals from the operator control unit 50 and transmitting the signals to the robot 100 and vice versa. Moreover, the repeater 500 may receive and transmit signals from other repeaters increasing a communication network 70 between the operator control unit 50 and the robot 100. For example, signals between the operator control unit 50 and the robot 100 may be receive and retransmitted by multiple repeaters 500 (in parallel and/or in series).

When the robot 100 enters a tunnel 20, if the repeater 500 is deployed at the entrance to the tunnel 20, as shown in FIG. 1B, it may maintain direct line-of-sight contact with both the robot 100 and the OCU 50. As a result, the robot 100 may drive relatively further into the tunnel 20 before communication is lost. In implementations in which the repeater 500 is a mobile robot, such as that shown in FIG. 6, the repeater 500 may move around to improve connectivity range down the tunnel 20. Additionally or alternatively, one or more repeaters 500 may be positioned in a breadcrumb trail down the tunnel 20 to further extend connectivity to the robot 100.

In a similar way, the repeater may improve the robot's performance in the investigation of buildings. Deployment of a repeater 500 in a doorway can increase a communications signal in the building. The repeater 500 may also improve the robot's performance over open ground. Assuming the repeater 500 has the same signal power as the OCU 50, deploying the repeater 500 at the edge of OCU communication may effectively double a mission range of the robot 100.

Figure 8A:
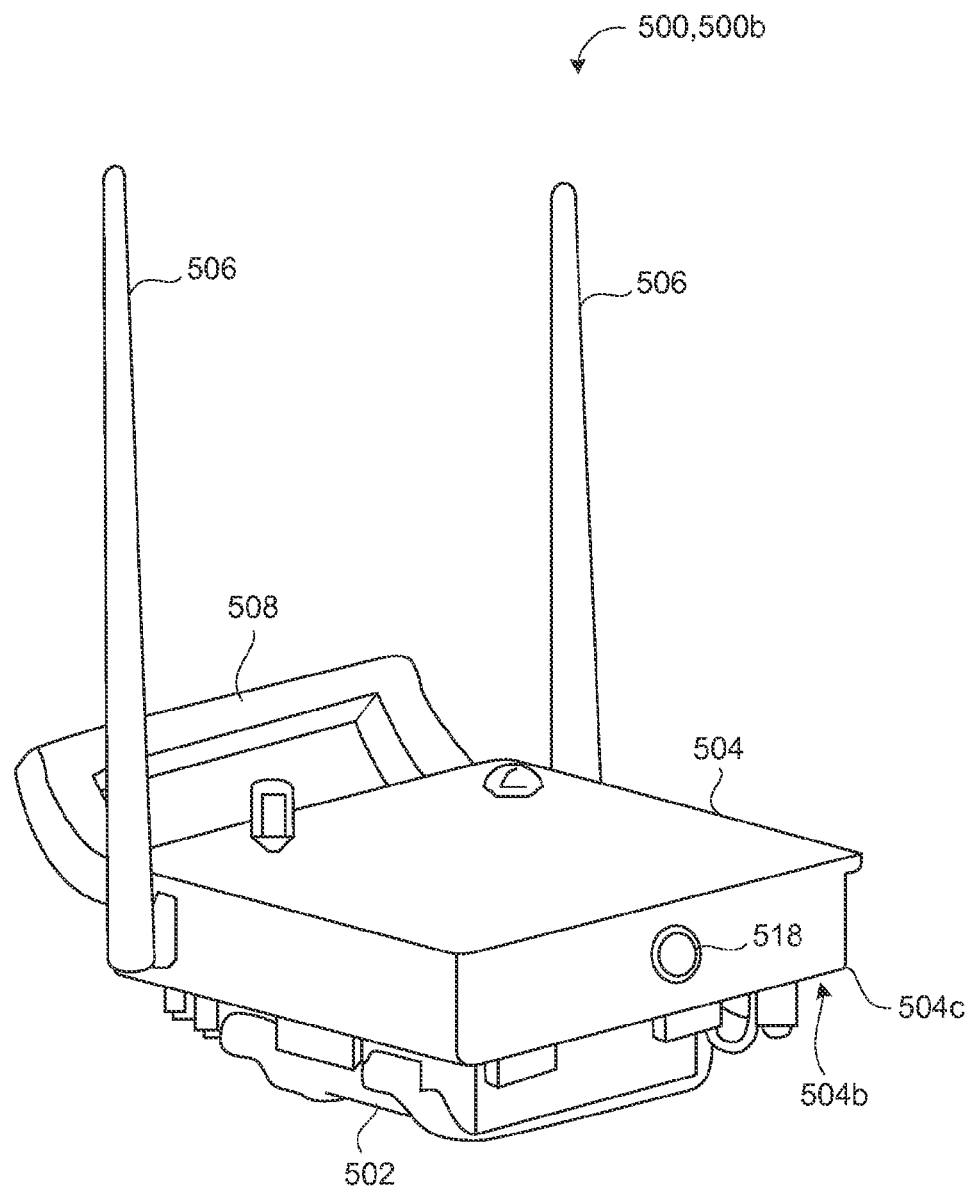
FIG. 8A is a perspective view of an exemplary stationary repeater.
Figure 8B:
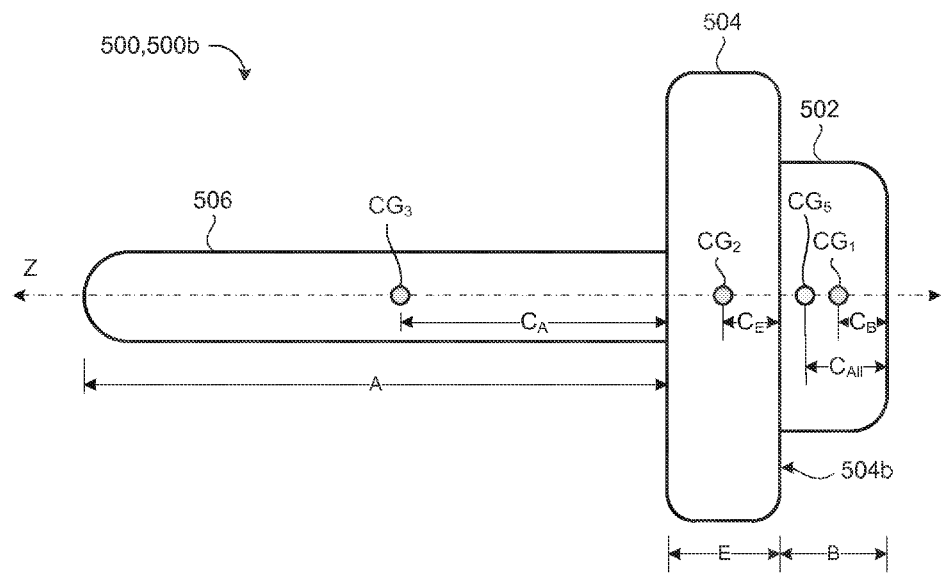
FIGS. 8B and 8C are side views of an exemplary stationary repeater.
Figure 8C:
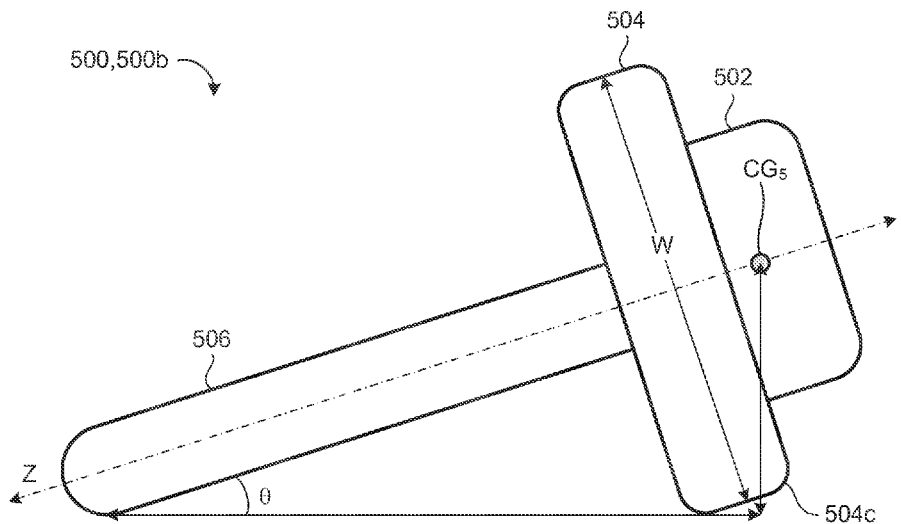
Figure 8E:
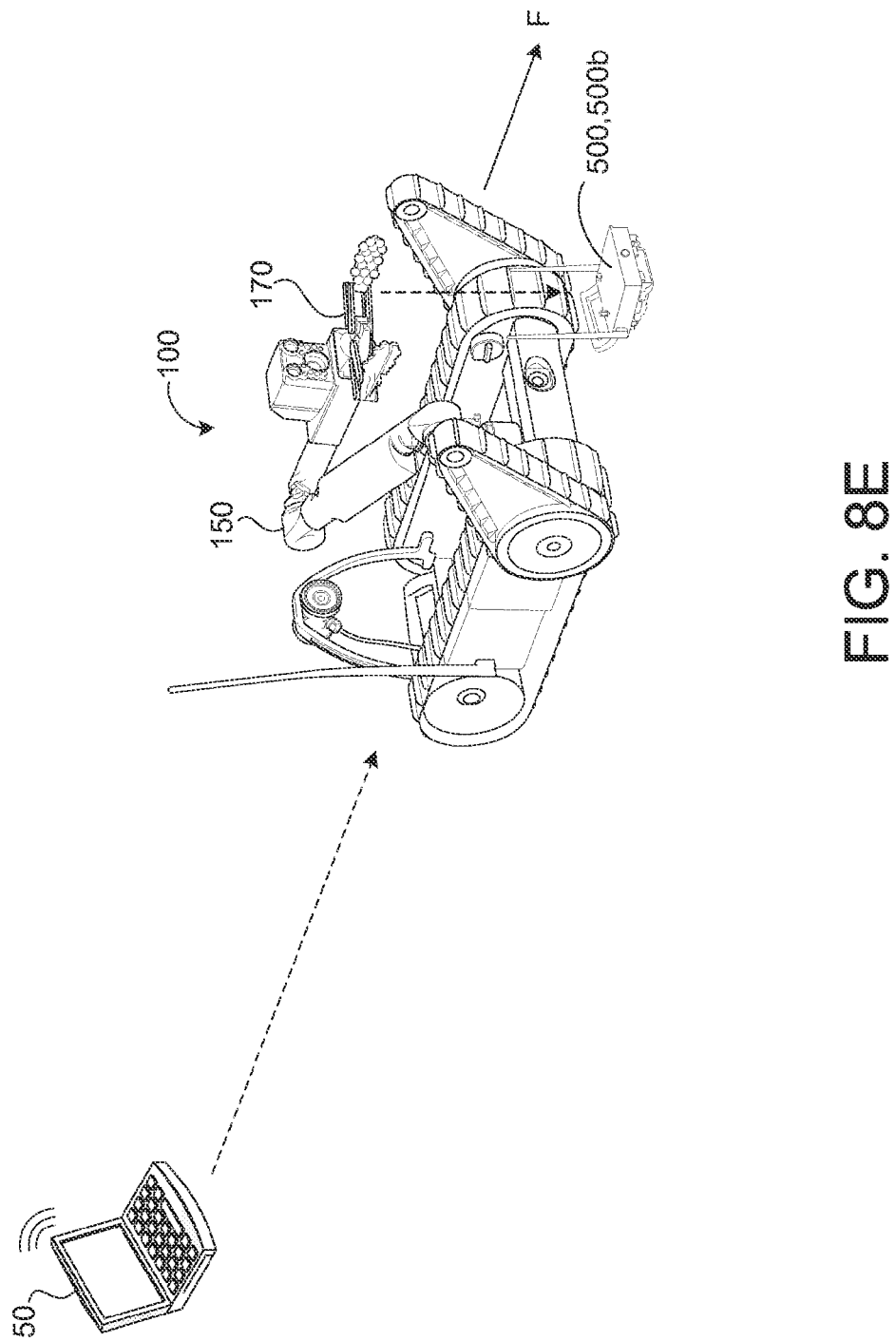
Figure 8F:
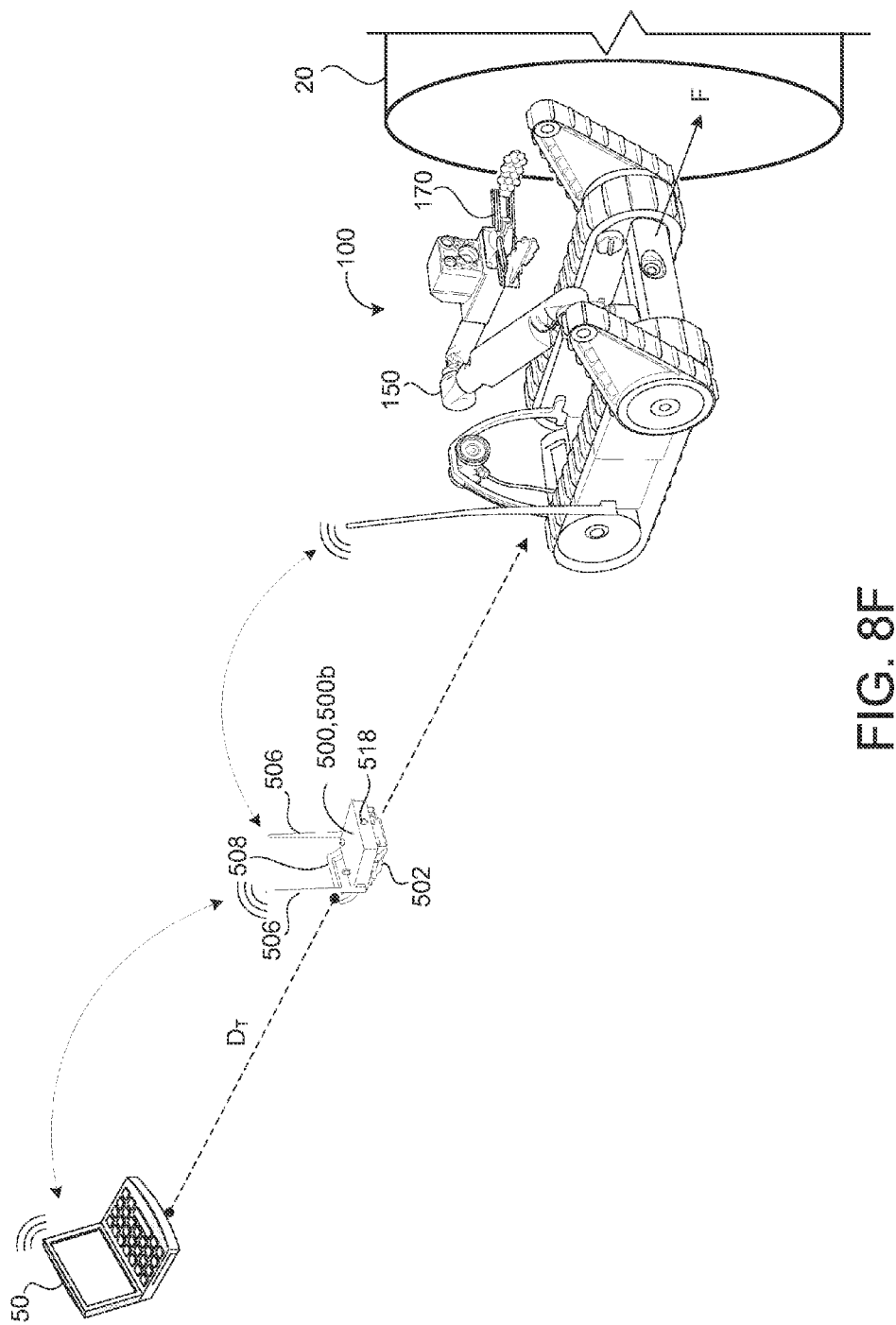

In some implementations, such as those shown in FIGS. 8D-8F, the repeater 500 is a payload of the mobile robot 100. The robot 100 can carry the repeater 500 to a threshold distance $D_T$ or communication range between the operator control unit 50 and the robot 100, and then deploy the repeater 500 to increase that communication range. Additionally or alternatively, the robot 100 can carry one or more repeaters 500 and drop them as the robot 100 moves into a tunnel 20, a building, or behind an obstacle. The repeater 500 may be a mobile situation awareness robot 500a or a stationary communicator 500b. In the case of a mobile repeater robot 500a, after deployment, the repeater robot 500a may maneuver autonomously or semi-autonomously (e.g., by a remote operator) to a location between the operator control unit 50 and the robot 100 that provides adequate communication therebetween and optionally additional situational awareness (e.g., sensor data, video, and/or other imagery using its sensor system).

Figure 6:
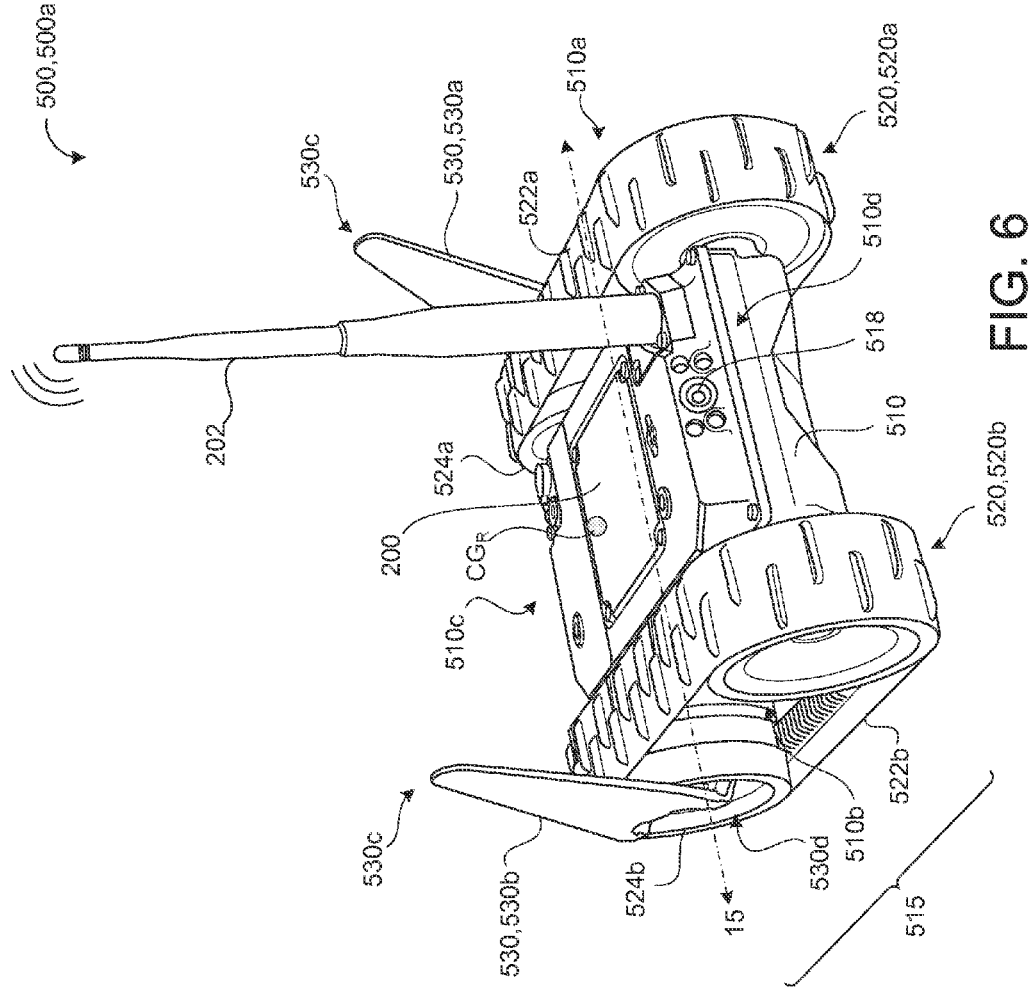
FIG. 6 is a perspective view of an exemplary repeater robot.

Referring to FIGS. 1A, 1B, and 6, in some implementations, the repeater robot 500a includes a main body 510 (or chassis) having a drive system 515 supported by the main body 510. The main body 510 has right and left sides 510a, 510b as well as a leading end 510c, a trailing end 510d. In some implementations, the drive system 515 includes right and left driven track assemblies 520a, 520b (also referred to as the main tracks 520) mounted on the corresponding right and left sides 510a, 5100b of the main body 510 and having right and left driven tracks 522a, 522b respectively. Each driven track 522a, 522b is trained about a corresponding front wheel 524a, 524b, which rotates about a drive axis 15. Although the robot 500a is depicted as having skid steer driven tracks, other drive systems are possible as well, such as differentially driven wheels, articulated legs, etc.

The repeater robot 500a may include at least one flipper 530 mounted on the main body 510. In the example shown, the robot repeater robot 500a includes right and left flippers 530a, 530b, which are shown in a partially retracted position extending behind the front or leading end 510c of the main body 510. The flippers 530, 530a, 530b each have a distal end 530c, and a pivot end 530d. Each flipper 530, 530a, 530b pivots about the drive axis 15 near the leading end 510c of the main body 510. In some implementations, the flippers 530, 530a, 530b can be rotated in unison in a continuous 360 degrees between a stowed position, in which the flippers 530a, 530b are next to the right and left sides 510a, 510b of the main body 510, and at least one deployed position, in which the flippers 530a, 530b are pivoted at an angle with respect to the main tracks 522a, 522b. The center of gravity $CG_R$ of the robot 500a can be contained within an envelope of the 360 degree rotation of the flippers 530a, 530b.

The main body 510 of the repeater robot 500a may include one or more cameras 518 positioned to have a field of view directed forward and/or rearward. The camera(s) 518 may capture images and/or video of the robot environment for navigating the robot 500a and/or performing specialized tasks, such as maneuvering through tunnels, sewers, and caves, etc. After deployment of the repeater robot 500a, the repeater robot 500a may maneuver autonomously or be maneuvered remotely to a vantage point that allows the robot 500a to view the remote operator 60 and/or the robot 100. The repeater robot 500a may include the same or similar controller 200, communications system 202, and sensor system 400 as the mobile robot 100. The communications system 202 of the repeater robot 500a receives a communication signal between the operator control unit 50 and the robot 100 and retransmits the signal.

In example shown in FIG. 1A, first and second repeater robots $500a_1$, $500a_2$ deployed by the operator 60 or the robot 100 provide a relatively increased and/or redundant communication network 70 between operator control unit 50 and the robot 100. If the first repeater robot $500a_1$ cannot repeat a transmission signal between the operator control unit 50 and the robot 100 (e.g., due to obstacles or obstructions) then the second repeater robot $500a_2$, if within range, can repeat the transmission signal between the operator control unit 50 and the robot 100. Moreover, both repeater robots $500a_1$, $500a_2$ can repeat the transmission signal between the operator control unit 50 and the robot 100, such that the operator control unit 50 and the robot 100 use the strongest signal and/or check for transmission errors.

Figure 7:
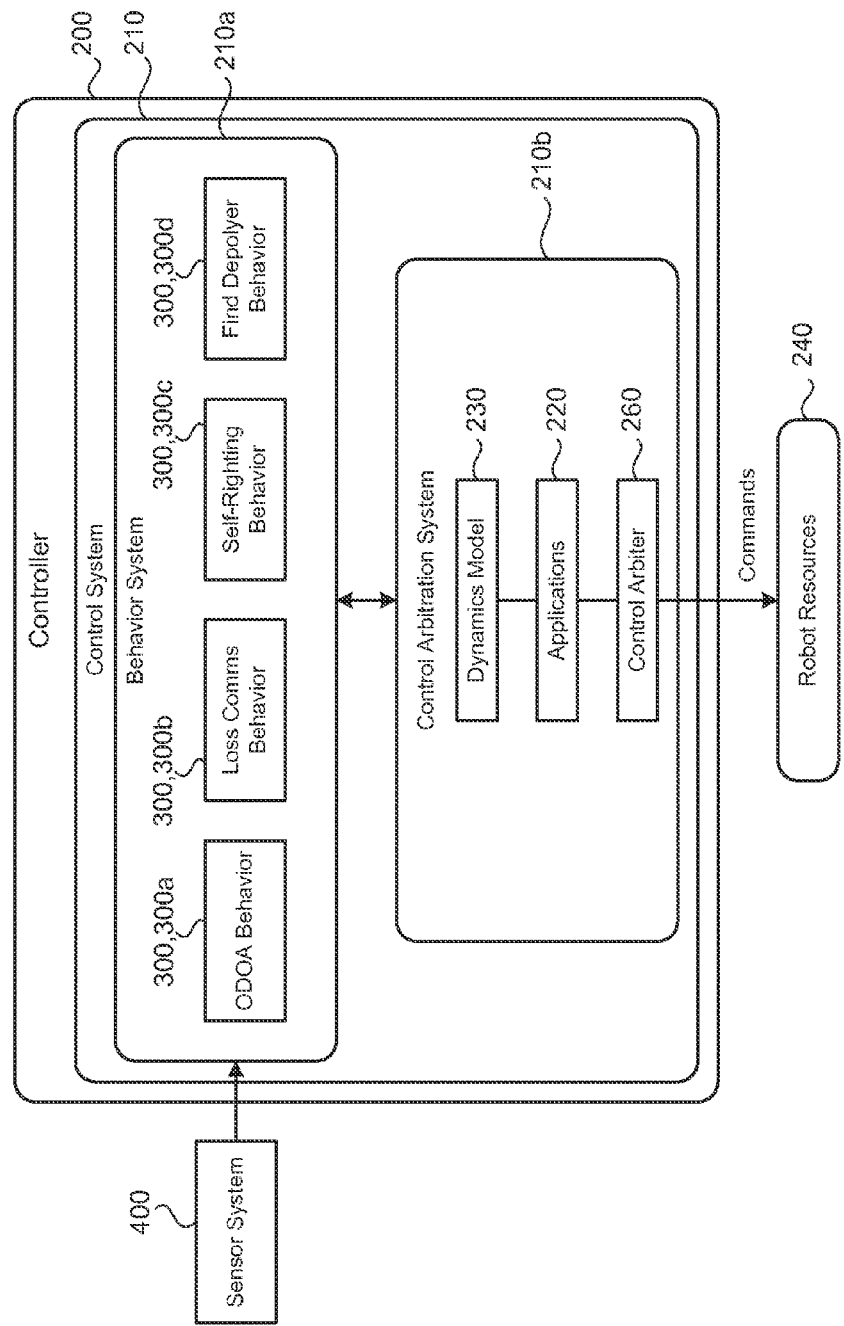
FIG. 7 is a schematic view of an exemplary robot control system.

Referring to FIG. 7, in some implementations, the controller 200 on the robot 100 and/or the repeater robot 500a executes a control system 210, which includes a behavior system 210a and a control arbitration system 210b in communication with each other. The controller may be a device having one or more computing processors in communication with memory capable of storing instructions executable on the computing processor(s). The control arbitration system 210b allows robot applications 220 to be dynamically added and removed from the control system 210, and facilitates allowing applications 220 to each control the robot 100 without needing to know about any other applications 220. In other words, the control arbitration system 210b provides a simple prioritized control mechanism between applications 220 and resources 240 of the robot 100.

The applications 220 can be stored in memory of or communicated to the robot 100, to run concurrently on (e.g., on a processor) and simultaneously control the robot 100. The applications 220 may access behaviors 300 of the behavior system 21a. The independently deployed applications 220 are combined dynamically at runtime and to share robot resources 240 (e.g., drive system 115, arm(s) 150, head(s) 160 and/or gripper(s) 170) of the robot 100. A low-level policy is implemented for dynamically sharing the robot resources 240 among the applications 220 at run-time. The policy determines which application 220 has control of the robot resources 240 required by that application 220 (e.g. a priority hierarchy among the applications 220). Applications 220 can start and stop dynamically and run completely independently of each other. The control system 210 also allows for complex behaviors 300 which can be combined together to assist each other.

The control arbitration system 210b includes one or more application(s) 220 in communication with s control arbiter 260. The control arbitration system 210b may include components that provide an interface to the control arbitration system 210b for the applications 220. Such components may abstract and encapsulate away the complexities of authentication, distributed resource control arbiters, command buffering, coordinate the prioritization of the applications 220 and the like. The control arbiter 260 receives commands from every application 220 generates a single command based on the applications' priorities and publishes it for its associated resources 240. The control arbiter 260 receives state feedback from its associated resources 240 and may send it back up to the applications 220. The robot resources 240 may be a network of functional modules (e.g., actuators, drive systems, and groups thereof) with one or more hardware controllers. The commands of the control arbiter 260 are specific to the resource 240 to carry out specific actions.

A dynamics model 230 executable on the controller 200 is configured to compute the center for gravity (CG), moments of inertia, and cross products of inertial of various portions of the robot 100 for the assessing a current robot state. The dynamics model 230 may be configured to calculate the center of gravity $CG_M$ of the main body 110, the center of gravity $CG_F$ of each flipper 130, the center of gravity $CG_A$ of each arm 150, the center of gravity $CG_H$ of each head 160, and/or the center of gravity $CG_R$ of the entire robot 100. The dynamics model 230 may also model the shapes, weight, and/or moments of inertia of these components. In some examples, the dynamics model 230 communicates with the inertial moment unit (IMU) 436 or portions of one (e.g., accelerometers and/or gyros) in communication with the controller 200 for calculating the various centers of gravity of the robot 100. The dynamics model 230 can be used by the controller 200, along with other programs 220 or behaviors 300 to determine operating envelopes of the robot 100, 500a and its components.

In some implementations, a behavior 300 is a plug-in component that provides a hierarchical, state-full evaluation function that couples sensory feedback from multiple sources, such as the sensor system 400, with a-priori limits and information into evaluation feedback on the allowable actions of the robot 100. Since the behaviors 300 are pluggable into the application 220 (e.g. residing inside or outside of the application 220), they can be removed and added without having to modify the application 220 or any other part of the control system 210. Each behavior 300 is a standalone policy. To make behaviors 300 more powerful, it is possible to attach the output of multiple behaviors 300 together into the input of another so that you can have complex combination functions. The behaviors 300 are intended to implement manageable portions of the total cognizance of the robot 100, 500a.

In the example shown, the behavior system 210a includes an obstacle detection/obstacle avoidance (ODOA) behavior 300a for determining responsive robot actions based on obstacles perceived by the sensor (e.g., turn away; turn around; stop before the obstacle, etc.). Another behavior 300 may include a loss communications behavior 300b for determining a driven path of the robot 100 during a loss of communication with a satellite for obtaining global positioning coordinates. The driven path can be determined using at least one of the inertial measurement unit IMU) 436, odometry, and dead reckoning.

A self-righting behavior 300c can provide actions for self-righting the robot 100 upon detecting a roll-over. Possible actions include rotating the flippers 130 a continuous 360 degrees to cause the main body to flip 180 degrees, since the center of gravity of the robot 100, 500a lies within the rotation envelope of the flippers 130. As a result, when the repeater robot 500a is deploy in a non-upright orientation, upon detecting the non-upright orientation using the sensor system 400 (e.g., using the IMU 436), the self-righting behavior 300c can cause execution of commands that rotate one or both flippers 130, 130a, 130b to move the robot 500a into an upright orientation (e.g., by rotating the flippers 130 a continuous 360°). Having the repeater robot 500a in an upright orientation can provide relatively better signal reception and transmission, as compared to other orientations.

A find deployer behavior 300d allows the repeater robot 500a to find its deployer, such as the operator 60 or the robot 100 that carried the repeater robot 500a as a payload. Execution of the find deployer behavior 300d by the behavior system 210a may cause execution of commands that ascertain imagery (such as a 3D volumetric point cloud) and/or video of the surrounding environment using the imaging sensor 518, identifying a deployer (e.g., using image recognition), and then orienting the repeater robot 500a to capture the deployer in a field of view of the imaging sensor 518. The find deployer behavior 300d may continue to reorient the repeater robot 500a to maintain the deployer in the field of view of the imaging sensor 518.

A heading hold behavior 300 provides an assistant behavior that allows the robot 100, 500a correct a heading of the driven robot 100, 500a. For example, if the robot 100, 500a hits a rock, obstacle, or course variation while driving in veers off course, the heading hold behavior 300 can automatically correct the heading of the robot 100, allowing the robot 100, 500a to maintain a drive direction issued by the user. Additional disclosure on behaviors and other robot features combinable herewith are provided in U.S. patent application Ser. No. 13/241,682, filed on Sep. 23, 2011, which is hereby incorporated by reference in its entirety.

Referring to FIGS. 8A-8C, in some implementations, the repeater 500 is configured as a stationary repeater 500b having a base 502 supporting an electronics enclosure 504, an antenna 506 and a handle 508 that may be selectively grasped and released by a gripper 170 of the robot 100 during portage and deployment. In some examples, the base 502 is a battery, which is typically the densest component. When deployed, the stationary repeater 500b rests stably on its base 502 (e.g., even on a rough or tilted surface). In the examples shown, when the stationary repeater 500b is standing upright, the antenna 506 points straight up (e.g., to provide effective communication). Moreover, if the stationary repeater 500b is deployed onto any side of the base 502, the shape and/or mass distribution of the base 502 (or the entire stationary repeater 500b) causes the stationary repeater 500b to roll upright. For example, the center of mass of each component may be located near a central axis Z of the stationary repeater 500b.

Referring to FIGS. 8B and 8C, the stationary repeater 500b may be sized according to a mathematical rule that causes the stationary repeater 500b to roll onto its base 502 and sit upright when deployed in non-upright orientation. Using the respective heights B, E, A, A, masses $M_B$, $M_E$, $M_A$, and heights $C_B$, $C_E$, $C_A$ of the individual centers of mass $CG_1$, $CG_2$, $CG_3$ of the base (battery) 502, the electronics enclosure 504, and the antenna 506, once can determine a location of the center of mass $CG_5$ of the entire stationary repeater 500b. If this entire center of mass $CG_5$ is below the bottom surface 504b of the electronics enclosure 504, the stationary repeater 500b will self-right.

The location of the center of mass $CG_5$, as a distance $C_{All}$ with respect to the bottom surface of the base 502, is as follows:

$$C_{ALL} = \frac{M_B(C_B) + M_E(C_E + B) + M_A(C_A + E + B)}{M_B + M_E + M_A} \quad (1)$$

This must be less than the height of the battery:

$$C_{ALL} = \frac{M_B(C_B) + M_E(C_E + B) + M_A(C_A + E + B)}{M_B + M_E + M_A} < B \quad (2)$$

This equation can be simplified as:

$$\frac{M_B(C_B) + M_E(C_E + B) + M_A(C_A + E + B)}{M_B + M_E + M_A} < B \quad (3)$$

$$M_B(C_B) + M_E(C_E + B) + M_A(C_A + E + B) < \quad (4)$$
$$B(M_B + M_E + M_A)$$
$$M_B C_B + M_E C_E + M_A C_A + M_A E < M_B B$$

In some implementations, the stationary repeater 500b cannot balance in any orientation other than right-side-up (i.e., upright). Making the antenna 506 relatively stiff and long eliminates the upside-down equilibrium orientation. An equation can express a length A of the antenna 506 necessary to allow the stationary repeater 500b to self-right on level ground. In order to configure the stationary repeater 500b to not balance in equilibrium on its side, the entire center of mass $CG_5$ of the stationary repeater 500l) must be positioned further toward or into the base 502 than a bottom corner 504c of the electronics enclosure 504.

The following equation expresses an inequality needed for the stationary repeater 500b to self-right, using.

$$(A + E + B - C_{ALL})\cos\theta > \frac{A}{\cos\theta} \quad (5)$$

Substituting $C_{All}$ with equation 1 provides:

$$\left(A + E + B - \frac{M_B(C_B) + M_E(C_E + B) + M_A(C_A + E + B)}{M_B + M_E + M_A}\right)\cos^2\theta > A \quad (6)$$

which can also be expressed as:

$$\left(\frac{M_B(A + E + B - C_B) + M_E(A + E - C_E) + M_A(A - C_A)}{M_B + M_E + M_A}\right)\cos^2\theta > A \quad (7)$$

Solving for $\cos(\theta)$ in terms of the maximum width W of the electronics enclosure 504 and an angle $\theta$ between the ground and the antenna 506 provides:

$$\cos\theta = \frac{A}{\sqrt{(W/2)^2 + A^2}} \quad (8)$$

Combining equations 7 and 8 and simplifying the expression yields the following:

$$\left(\frac{\begin{array}{c}M_B(A + E + B - C_B) + \\ M_E(A + E - C_E) + M_A(A - C_A)\end{array}}{M_B + M_E + M_A}\right)\left(\frac{A}{\sqrt{(W/2)^2 + A^2}}\right)^2 > A \quad (9)$$

$$\frac{\begin{array}{c}M_B(A + E + B - C_B) + \\ M_E(A + E - C_E) + M_A(A - C_A)\end{array}}{M_B + M_E + M_A} * \frac{A^2}{((W/2)^2 + A^2)} > A \quad (10)$$

$$\frac{\begin{array}{c}M_B(A + E + B - C_B) + \\ M_E(A + E - C_E) + M_A(A - C_A)\end{array}}{M_B + M_E + M_A} * \frac{A}{W^2/4 + A^2} > 1 \quad (11)$$

$$\frac{\begin{array}{c}M_B(A + E + B - C_B) + \\ M_E(A + E - C_E)M_A(A - C_A)\end{array}}{M_B + M_E + M_A} > \frac{W^2/4 + A^2}{A} \quad (12)$$

$$\frac{\begin{array}{c}M_B(A + E + B - C_B) + \\ M_E(A + E - C_E) + M_A(A - C_A)\end{array}}{M_B + M_E + M_A} > \frac{W^2}{4A} + A \quad (13)$$

$$\frac{\begin{array}{c}(M_B + M_E + M_A)A + \\ M_B(E + B - C_B) + M_E(E - C_E) - M_A C_A\end{array}}{M_B + M_E + M_A} > \frac{W^2}{4A} + A \quad (14)$$

$$A + \frac{M_B(E + B - C_B) + M_E(E - C_E) - M_A C_A}{M_B + M_E + M_A} > \frac{W^2}{4A} + A \quad (15)$$

$$\frac{M_B(E + B - C_B) + M_E(E - C_E) - M_A C_A}{M_B + M_E + M_A} > \frac{W^2}{4A} \quad (16)$$

A stationary repeater 500b meeting the relationship expressed in equation 16 will self-right when deployed in a non-upright orientation. Additionally or alternatively, the stationary repeater 500b may meet the following simplified relationship to self-right when deployed in a non-upright orientation.

$$M_E E < M_B B \quad (17)$$

As shown in FIGS. 8D-8F, the robot 100 travelling in a forward direction F can carry one or more stationary repeaters 500b (e.g., as a payload) and drop them in various locations to setup a communication network 70 between the OCU 50 and the robot 100 and/or to provide additional situation awareness. In some examples, the stationary repeater 500b includes a camera 518 to capture images/video of the surrounding environment and/or to provide an additional vantage point of the robot 100 or some other scene of interest.

Referring again to FIG. 1A, the operator control unit (OCU) 50 allows the user 60 to teleoperate the robot 100 and/or one or more repeater robots 500a as well as to receive and view sensory feedback from the robot 100 and/or repeater robot(s) 500a. For example, the operator control unit 50 may analyze and display sensor data (e.g., as a graphical representation). Moreover, the user 60 can view images and/or video of an object viewed by the camera(s) 118, 119, 162, 172, 518. In some examples, the robot 100 captures imagery of its surroundings using the camera(s) 118, 119, 162, 172), such as visible light images, stitched images, video, infrared images, etc. Using the operator control unit 50, the operator 30 may remotely control the robot 100 to maneuver the robot 100 to perform a mission while staying a safe distance away (e.g., 50-300 feet away).

Figure 9:
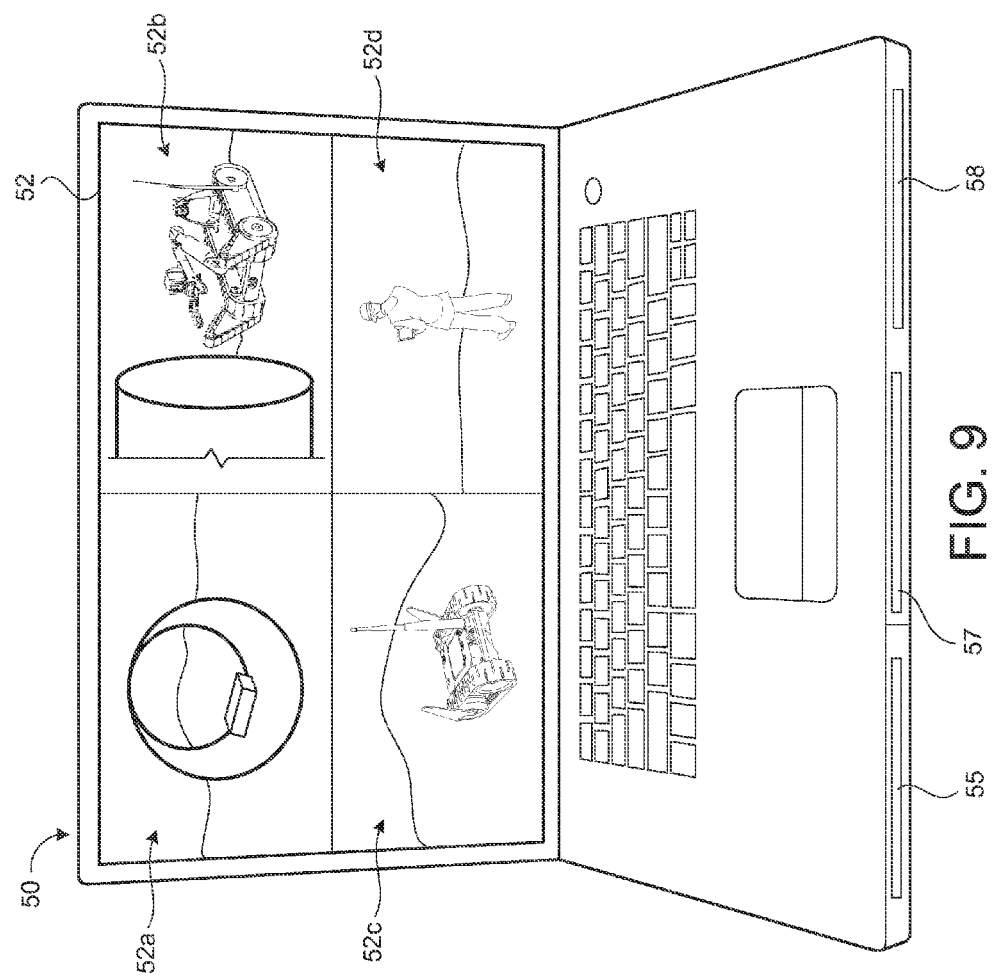
FIG. 9 is a front perspective view of an exemplary operator control unit.

Referring also to FIG. 9, in some implementations, the operator control unit 50 displays on its screen 52 multiple views 52a-d providing one or more images or video captured by the robot 100 and/or a repeater 500. The operator control unit 50 may display a first-person view 52a from the robot 100 (e.g., into the tunnel 20), a third person view 52b of the robot 100 from a nearby first repeater robot 500a₁, a third person view 52c of the first repeater robot 500a₁ from a stationary repeater 500b, another third person view 52c of the remote operator 60 from the second repeater robot 500a₂ within the communication network 70. The multiple views 52a-d allows the remote operator 60 to gain multiple vantage points from each device in the syndication network 70 as well as remotely operate one or more mobile robots 100, 500a.

In some implementations, the OCU 50 has a display screen 52 and a network interface 58 that simultaneously receives and displays views from two or more robots 100 and/or repeaters 500, 500a, 500b, one of the robots 100 or repeaters 500 being an access point for the other. A first robot 100 may transmit video to a second robot 100 and/or a repeater 500, and the second robot 100 or the repeater 500 may send to the OCU 50 both the video signal of the second robot 100 or repeater 500 and the relayed video signal from the first robot 100. The OCU 50 runs software that sorts out the video signal of the first robot 100 from the video signal of the second robot 100 or the repeater 500. By relaying in this manner, the video signal of the first robot 100 reaches the OCU 50 instead of being lost when the first robot 100 is out of range, down a tunnel 20 or otherwise too far from the OCU 50 for reception of a radio signal. In some examples, either of the first robot 100 or the second robot 100 (or repeater 500) is able to transport and route all of the video signals simultaneously. The robot 100 may carry and drop a repeater 500 at an entrance 22 (e.g., of a tunnel 20, building, etc.) so that the remote operator 60 can view movement of the robot 100 through the entrance 22 and into a structure (e.g., natural or man-made). In a military operation, this allows the remote operator 60 to look for adversarial advancements about the robot 100 as well as maintain communications with the robot 100 through the extended vacations network 70 afforded by the repeater 500. The operator control unit 50 may also display navigation views, mapping views, robot health views etc. for remotely operating the robot(s) 100, 500a and conducting a mission.

Figure 10:
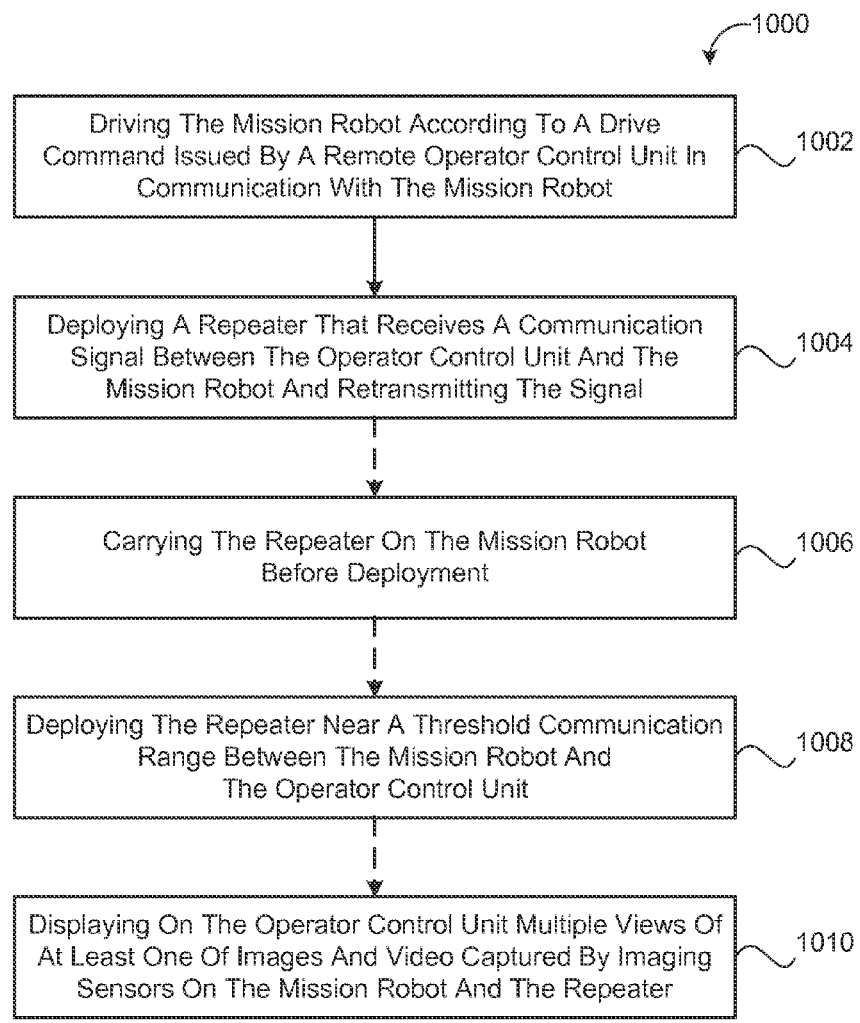
FIG. 10 provides an exemplary arrangement of operations for a method of operating a mobile robot.

FIG. 10 provides an exemplary arrangement 1000 of operations for a method of operating a mobile mission robot 100. The method includes driving 1002 the mission robot according to a drive command issued by a remote operator control unit 50 in communication with the mission robot 100 and deploying 1004 a repeater 500. The repeater 500 receives a communication signal between the operator control unit 50 and the mission robot 100 and retransmits the signal.

In some implementations, the method includes carrying 1006 the repeater on the mission robot before deployment. The method may include deploying 1008 the repeater near a threshold communication range between the mission robot 100 and the operator control unit 50. Consequently, the repeater 500 can extend a communication network 70 between the mission robot 100 and the operator control unit 50. Moreover, the repeater 500 may retransmit the received signal at a power level greater than or equal to a power level of the received signal.

The method may include displaying 1010 on the operator control unit 50 multiple views 52a-d of at least one of images and video captured by imaging sensors 118, 119, 162, 172, 518 on the mission robot 100 and the repeater 500. This allows the operator 60 of the operator control unit 50 to view a first-person view 52a from the mission robot 100 and a third person view 52b-d from the repeater 500 (e.g., a view of the mission robot 100, a view along a drive path of the mission robot 100, and/or a view of the operator 60). In some implementations, the repeater 500 is a mobile robot 500a and the method includes driving the repeater robot 500a according to a drive command issued by the remote operator control unit 50. Additionally or alternatively, the repeater 500 can be a stationary communicator 500b carried by and deployed from the mission robot 100 as a payload.

In some implementations, the method includes executing a control system 210 on the controller 200 of the repeater robot 500a. The control system 210 includes a behavior system 210a and a control arbitration system 210b in communication with each other. The behavior system 210a executes at least one behavior 300 that influences execution of commands by the control arbitration system 210b based on sensor signals received from a sensor system 400 in communication with the controller 200 of the repeater robot 500b. In some examples, the method includes executing a self-righting behavior 300c on the behavior system 210a. The self-righting behavior 300c causes execution of commands in response to receiving an indication of a non-upright orientation to rotate at least one flipper 530 rotatably coupled to the robot body 510 a continuous 360 degrees, causing the main body 510 to flip 180 degrees. A center of gravity $CG_R$ of the repeater robot 500a is located within a rotation envelope of the at least one flipper 530. Additionally or alternatively, the method may include executing a find deployer behavior 300d on the behavior system 510a. The find deployer behavior 300d causes execution of commands to ascertain imagery of a surrounding environment using an imaging sensor 518 in communication with the controller 200 of the repeater robot 500a, identify a deployer of the repeater robot 500a (e.g., the operator 60 or the mission robot 100), and orient the repeater robot 500a to capture the deployer in a field of view of the imaging sensor 518 of the repeater robot 500a. This allows the operator to maintain a constant third-person view of himself/herself (for safety) and/or the mission robot 100, with constant manual re-orientation of the repeater robot 500a.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of operating a mobile mission robot, the method comprising:
    driving the mobile mission robot according to a drive command issued by a remote operator control unit in communication with the mobile mission robot, the mobile mission robot having a gripper thereon for retaining and transporting a repeater robot in communication with the operator control unit and the mobile mission robot, the repeater robot comprising:
        a robot body;
        a drive system supporting the robot body and configured to maneuver the repeater robot over a work surface;
        a sensor system disposed on the robot body; and
        a controller in communication with the drive system, the sensor system, and the operator control unit, the controller configured to execute a control arbitration system and a behavior system in communication with each other, the behavior system executing at least one behavior that influences execution of commands by the control arbitration system based on sensor signals received from the sensor system, the controller having a communication system configured to:
            receive a first communication signal from the operator control unit and retransmit the first communication signal to the mobile mission robot; and/or
            receive a second communication signal from the mobile mission robot and retransmit the second communication signal to the operator control unit;

deploying the repeater robot by releasing the repeater robot from the gripper at a first distance from the operator control unit; and driving the mobile mission robot to a second distance from the operator control unit, the second distance being greater than the first distance.

2. The method of claim 1, wherein the second distance is beyond a threshold communication range of the operator control unit and the operator control unit is unable to directly transmit the first communication signal to the mobile mission robot at the second distance.

3. The method of claim 1, further comprising deploying the repeater robot near a threshold communication range between the mobile mission robot and the operator control unit.

4. The method of claim 1, wherein the repeater robot retransmits the first communication signal and/or the second communication signal at a power level greater than or equal to a power level of the respective first communication signal and/or the respective second communication signal.

5. The method of claim 1, further comprising displaying on the operator control unit multiple views of at least one of images and video captured by imaging sensors on the mobile mission robot and the repeater robot.

6. The method of claim 5, wherein the repeater robot at the first distance receives images or videos captured by imaging sensors on the mobile mission robot and transmits images or videos captured by the imaging sensors on the mobile mission robot and the repeater robot to the operator control unit.

7. The method of claim 1, further comprising executing a self-righting behavior on the behavior system, the self-righting behavior causing execution of commands in response to receiving an indication of a non-upright orientation to rotate at least one flipper rotatably coupled to the robot body a continuous 360 degrees, causing the robot body to flip 180 degrees, a center of gravity of the repeater robot located within a rotation envelope of the at least one flipper.

8. The method of claim 1, further comprising executing a find deployer behavior on the behavior system, the find deployer behavior causing execution of commands to:
ascertain imagery of a surrounding environment using an imaging sensor in communication with the controller of the repeater robot;
identify a deployer of the repeater robot; and
orient the repeater robot to capture the deployer in a field of view of the imaging sensor of the repeater robot.

9. The method of claim 1, further comprising retaining a repeater beacon with the gripper and deploying the repeater beacon by releasing the repeater beacon from the gripper at a third distance from the operator control unit, the repeater beacon comprising:
a battery base;
an electronics enclosure supported by the battery base; and
at least one antenna supported by at least one of the battery base and the electronics enclosure;
wherein a product of a center of mass and a height of the electronics enclosure is less than a product of a center of mass and a height of the battery base.

10. A method of operating a mobile mission robot, the method comprising:
driving the mobile mission robot into a tunnel according to a drive command issued by a remote operator control unit in communication with the mobile mission robot; and
deploying a repeater robot at an entrance of the tunnel along an axis defined by the tunnel, the repeater robot having a direct line of sight into the tunnel along or in parallel to the tunnel axis, the repeater robot comprising:
a robot body;
a drive system supporting the robot body and configured to maneuver the repeater robot over a work surface;
a sensor system disposed on the robot body; and
a controller in communication with the drive system, the sensor system, and the operator control unit, the controller configured to execute a control arbitration system and a behavior system in communication with each other, the behavior system executing at least one behavior that influences execution of commands by the control arbitration system based on sensor signals received from the sensor system, the controller having a communication system configured to:
receive a communication signal from the operator control unit and retransmit that communication signal to the mobile mission robot positioned in the tunnel; and/or
receive a communication signal from the mobile mission robot and retransmit that communication signal to the operator control unit.

11. The method of claim 10, wherein the operator control unit is unable to directly transmit a communication signal to the mobile mission robot positioned in the tunnel.

12. The method of claim 10, wherein the robot comprises a gripper configured to grasp, transport, and release the repeater robot.

13. The method of claim 10, further comprising driving the repeater robot to the tunnel entrance according to a drive command issued by the remote operator control unit.

14. The method of claim 10, further comprising driving the repeater robot around the tunnel entrance or into the tunnel along the tunnel axis to improve communication connectivity with the mobile mission robot in the tunnel.

15. The method of claim 10, further comprising deploying two or more repeater robots sequentially along the tunnel axis at different distances from the operator control unit, the repeater robot having the greatest distant from the operator control unit being closest to and in communication with the mobile mission robot.

16. The method of claim 10, further comprising displaying on the operator control unit multiple views of at least one of images and video captured by imaging sensors on the mobile mission robot and the repeater robot.

17. A remote controller comprising:
a computing processor;
a display in communication with the computing processor; and
a network interface in communication with the computing processor, the network interface receiving and displaying on the display images or video from first and second robots simultaneously, the first robot being an access point for the second robot by transporting and routing signals from both robots to the network interface, the first robot comprising:
a robot body;
a drive system supporting the robot body and configured to maneuver the first robot over a work surface;
a sensor system disposed on the robot body; and
a controller in communication with the drive system, the sensor system, and the operator control unit, the controller configured to execute a control arbitration system and a behavior system in communication with each other, the behavior system executing at least one behavior that influences execution of commands by the control arbitration system based on sensor signals received from the sensor system, the controller having a communication system configured to:
receive a first communication signal from the network interface and retransmit the first communication signal to the second robot; and/or
receive a second communication signal from the second robot and retransmit the second communication signal to the network interface.

18. The remote controller of claim 17, wherein the first robot receives images or videos captured by imaging sensors on the first and second robots and transmits the images or video to the network interface.

19. The remote controller of claim 17, further comprising non-transitory memory storing executable code stored and in communication with the computing processor, the executable code identifying the images or video originating from the first robot and the images or video originating from the second robot and instructing the remote controller to present the images or video accordingly on the display.

20. The remote controller of claim 17, wherein either the first robot or the second robot can act as the access point for the other robot.

21. The remote controller of claim 17, wherein the first robot is at or within a threshold communication distance for communicating with the network interface and the second robot is positioned beyond the threshold communication distance.

* * * * *